United States Patent [19]
Garrett et al.

[11] Patent Number: 4,991,217
[45] Date of Patent: Feb. 5, 1991

[54] DUAL PROCESSOR SPEECH RECOGNITION SYSTEM WITH DEDICATED DATA ACQUISITION BUS

[75] Inventors: Mary A. Garrett, Ridgefield, Conn.; Gideon Shichman, New York, N.Y.

[73] Assignee: IBM Corporation, Armonk, N.Y.

[21] Appl. No.: 676,754

[22] Filed: Nov. 30, 1984

[51] Int. Cl.$^5$ ............................ G10L 5/06; G06F 3/16
[52] U.S. Cl. ........................................ 381/43; 364/900
[58] Field of Search .................................... 381/41–46, 381/513.5, 36–40; 364/200 MS File, 900 MS File

[56] References Cited

U.S. PATENT DOCUMENTS

| | | | |
|---|---|---|---|
| 3,483,325 | 12/1969 | Stewart | 381/36 |
| 3,641,500 | 2/1972 | Greenias et al. | 367/198 |
| 3,972,023 | 7/1976 | Bodner et al. | 364/200 |
| 4,181,813 | 1/1980 | Marley | 381/44 |
| 4,283,601 | 8/1981 | Nakajima et al. | 364/513.5 |
| 4,388,495 | 7/1983 | Hitchcock | 381/43 |
| 4,567,606 | 1/1986 | Vensko et al. | 381/43 |
| 4,638,451 | 1/1987 | Hester et al. | 364/513.5 |
| 4,799,144 | 1/1989 | Parruck et al. | 364/200 |

FOREIGN PATENT DOCUMENTS

| | | |
|---|---|---|
| 0108354 | 10/1983 | European Pat. Off. |
| 53-94836 | 8/1978 | Japan |
| 55-131832 | 10/1980 | Japan |
| 55-153024 | 11/1980 | Japan |
| 56-145415 | 11/1981 | Japan |
| 58-8338 | 1/1983 | Japan |
| 58-169612 | 10/1983 | Japan |

OTHER PUBLICATIONS

Hellwarth, "Automatic Conditioning of Speech Signals", IEEE Trans. on Audio and Electroacoustics, vol. AU-16, No. 2, Jun. 1968.
Dusek, "Voice Recognition Joins Speech on Programmable Board", Electronics International, vol. 56 (1983), APR, No. 8, New York., U.S.A.
"New Board Provides Voice I/O for PCS", Electronic Engineering, vol. 56, No. 690, Jun. 1984, p. 19.
Jones, "Building Block Circuits Simplify Integration on Voice-Input Systems", Computer, Technology Review, vol. 3 (1983), Jan, No. 1.
"ISBC 660 System Chassis Hardware Reference Manual", Intel Corp., Santa Clara, Calif. 95051, 1980.
"DT 3752-DT 3754 User Manual", document UM-00-73-B-556, 1982, from Data Translation, Marlborough, Mass. 01752.
"DT3762 User Manual", Document UM-001-13-D-557, 1980, Data Translation, Marlborough, Mass. 01752.
The SP-16 Signal Processor-G. Underboeck et al.-1984 International Conference on Acoustics, Speech & Signal Processing, pp. 16.2.1–16.2.4.
New Board Provides Voice I/O for PCs-Electronic Engineering-Jun. 1984, p. 19.
Voice Recognition Joins Speech on Programmable Board-Electronics-Apr. 21, 1983, pp. 128–132.
Building-Block Circuits Simplify Integration on Voice-Input Systems-pp. 63–67.
A Programmable Voice Digitizer Using the T.I. TMS 320 Microcomputer-Daniel F. Daly-ICASSP '83, pp. 475–478.
Advanced Data Acquisition Aids the Handicapped-Andrew Davis-System Design-'83, pp. 121–131.
Speech Output for HP Senes 80 Personal Computers-Loren M. Koehler-Hewlett-Packard Journal, '84-pp. 29–36.

Primary Examiner—Gary V. Harkcom
Assistant Examiner—John A. Merecki
Attorney, Agent, or Firm—Sughrue, Mion, Zinn, Macpeak & Seas

[57] ABSTRACT

Voice signals amplified in a programmable gain, programmable bandwidth subsystem are digitized and buffered and the digitized signals are transferred over a dedicated high speed bus to a speech processor, thus relieving the speech processor and its resident host of the overhead of high data rate transfers and permitting a relatively low capacity computer to accomplish voice recognition on a real time basis.

9 Claims, 16 Drawing Sheets

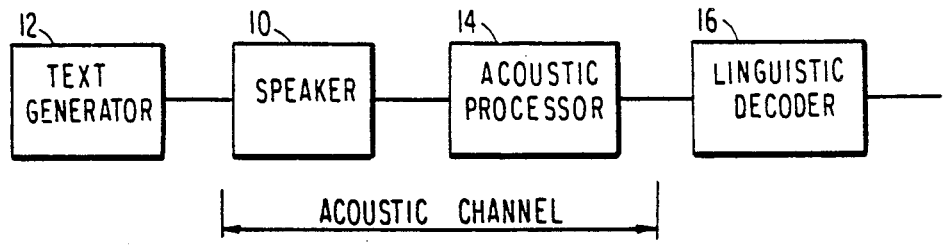
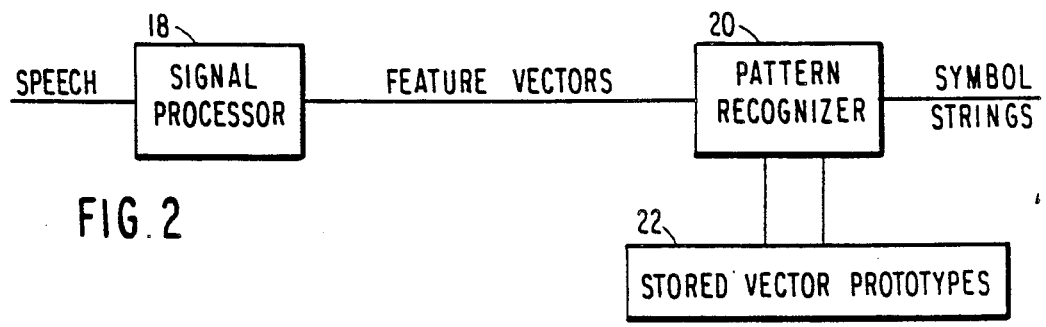
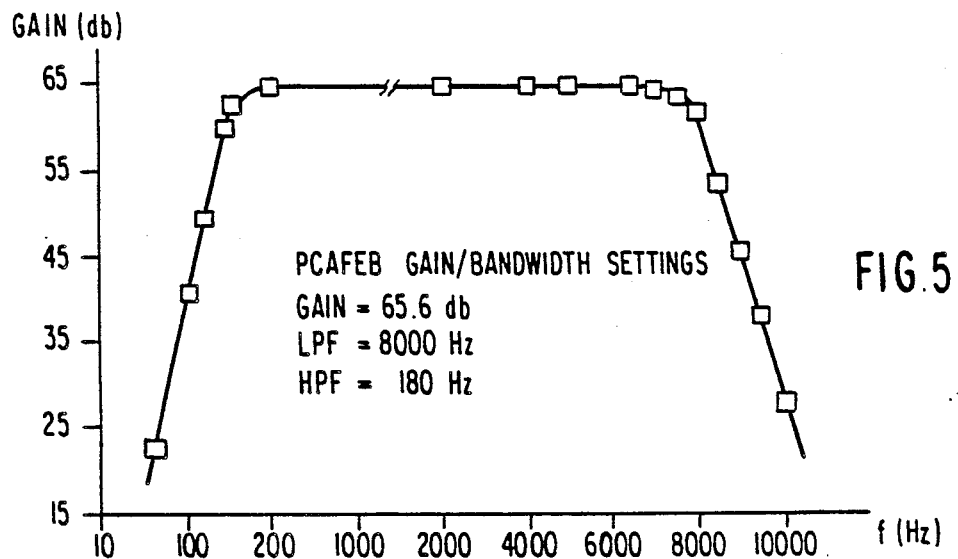
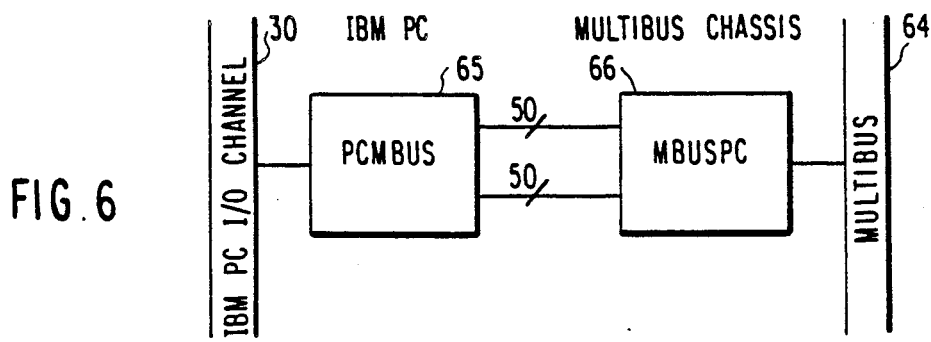

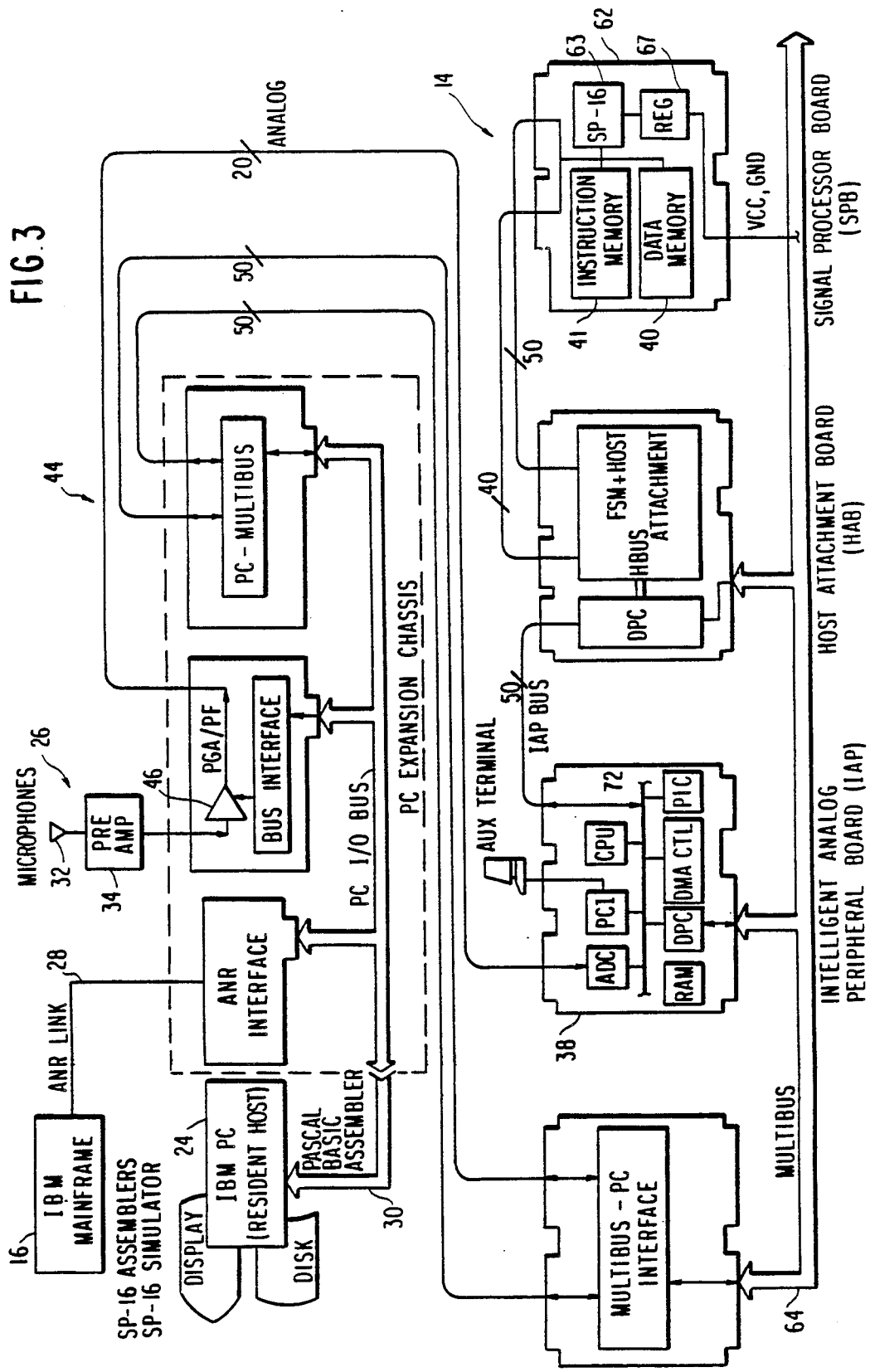

IAP MEMORY MAP

AP MEMORY MAP
(PC MEMORY SPACE)

IAP I/O MAP

AP I/O MAP
(PC I/O SPACE)

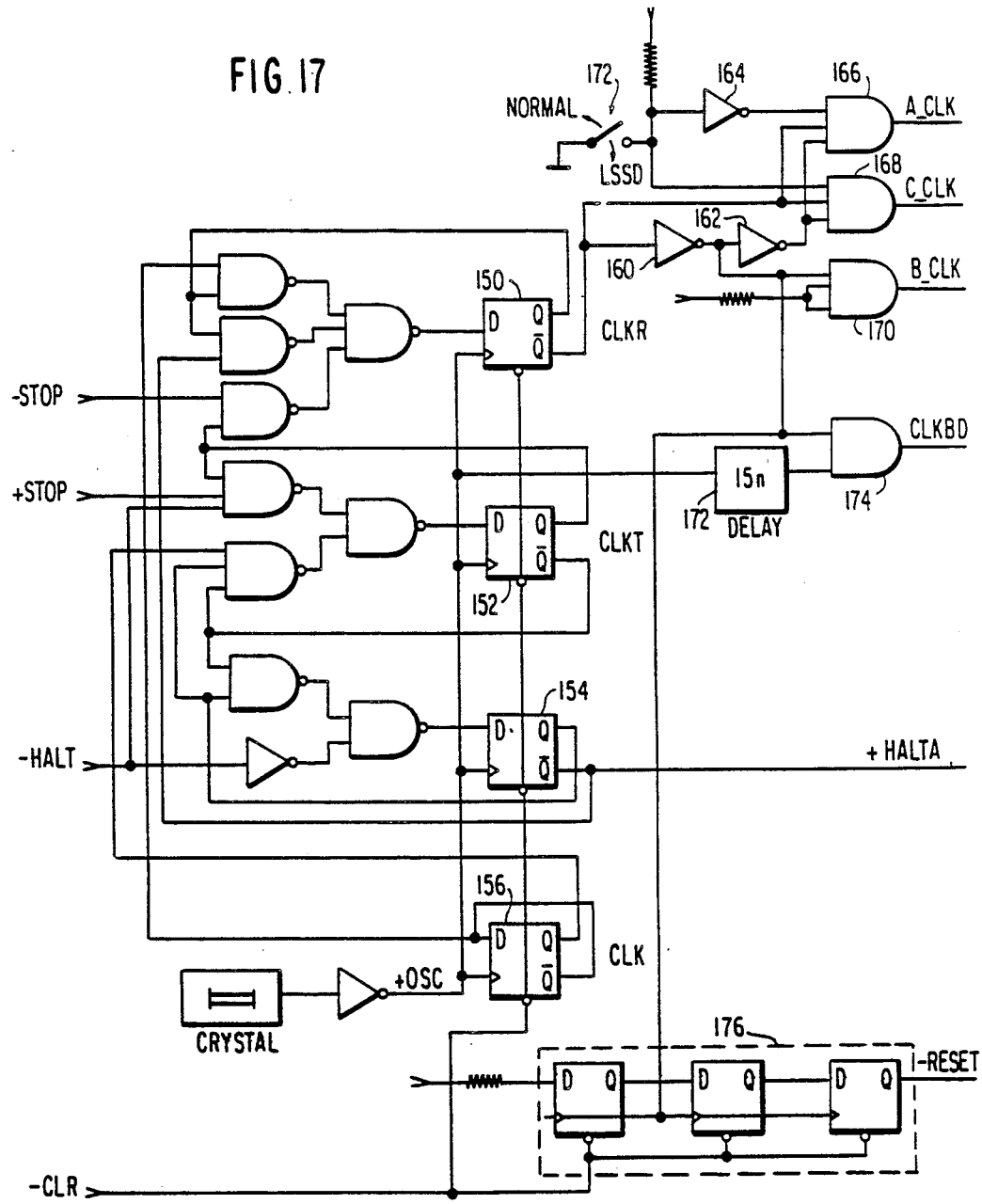

FIG. 24a

| MSB | 6 | 5 | 4 | 3 | 2 | 1 | LSB |
|---|---|---|---|---|---|---|---|
| MRESET | HALT | NOP | STIAB | SDABR | STOP | SDABW | RESUME |

FIG. 24b

| MSB | 6 | 5 | 4 | 3 | 2 | 1 | 0 |
|---|---|---|---|---|---|---|---|
| PARITY | STOP | HALT | HALTA | INTA | LSSD_OUT | INT | CLR |

FIG. 24c

| (MSB) | 6 | 5 | 4 | 3 | 2 | 1 | (LSB) |
|---|---|---|---|---|---|---|---|
| N.A. | PC_IRQ2 | PC_IRQ1 | PC_IRQ0 | IAP_IRQ2 | IAP_IRQ1 | IAP_IRQ0 | SPSEL |

DUAL PROCESSOR SPEECH RECOGNITION SYSTEM WITH DEDICATED DATA ACQUISITION BUS

BACKGROUND OF THE INVENTION

This invention is directed to speech recognition systems, and more particularly to a technique for implementing such a system using a relatively slow host processor having a high speed signal processing subsystem. The invention will be described in the context of a speech recognition system, although it should be appreciated that the signal processing arrangement of this invention could be applied as well to other systems, e.g. speech compression, data communication, biomedical signal processing, etc.

A typical speech recognition "philosophy" formulates the problem of recognizing continuous as well as isolated speech in the framework of communication theory. With reference to FIG. 1, the speaker 10 recites text presented by a text generator 12. In read speech, the text is a written memo, letter, document, etc. In spontaneous speech, the text is some form of higher cortical functions in the speaker's brain. The acoustic processor (AP) 14 converts the acoustic waveform into a sequence of symbols suitable for the linguistic decoder (LD) 16. The LD 16 attempts to deduce the text read by the speaker by choosing that word sequence which accounts best for the acoustic processor output symbols.

The acoustic processor 14 can be viewed as a vector quantizer which quantizes the continuous speech waveform into a finite alphabet of representative symbols. A functional block diagram of the acoustic processor 14 may be as shown in FIG. 2. The signal processor 18 receives the speech from the speaker 10 and calculates the Discrete Fourier Transform (DFT) of 20 msec long segments of the speech signal. A feature vector is formed from the power spectrum of the speech segment using the critical band method, and a pattern recognizer 20 compares the generated feature vector with vector prototypes from vector storage 22. The pattern recognizer 20 then provides at its output a label of the particular stored vector prototype which is nearest to the feature vector in some predefined metric.

The computational requirements for a speech recognition system of the type described above are in the 10 MIPs (million instructions per second) range with heavy usage of multiplication operations. In order for the vector quantizer to run in real time, a high speed signal processor must be used, e.g., the SP-16 processor disclosed by G. Ungerboeck et al, "SP-16 Signal Processor", 1984 International Conference on Acoustics, Speech and Signal Processing, incorporated herein by reference.

It is therefore an object of the present invention to provide a continuous speech recognition system which enables a lower speed computer to perform speech recognition on a real time basis.

SUMMARY OF THE INVENTION

Briefly, the above and other objects of the invention are achieved by a speech recognition system according to the present invention wherein a relatively high speed signal processor is used to implement the vector quantizer and a lower speed computer acts as a resident host for the higher speed signal processor. The speech waveform is first picked up by a sensitive microphone preamplifier, and the pre-amplified signal is then processed by a programmable gain-bandwidth subsystem located in the host main frame. The preconditioned signal is then digitized and buffered by an Intelligent Analog Peripheral Board, which is itself a complete 8085-based microcomputer. Signal processing and acoustic labelling are then performed by the high speed signal processor. By transferring the speech information to the signal processor over a separate high-speed bus, the host computer and speech processor are relieved of the overhead of high data rate transfers, thus permitting a relatively low capacity computer to accomplish speech recognition on a real time basis.

Communication between the "slow" host processor and the "fast" signal processor instruction and data busses is realized by a Host Attachment comprising a set of registers and drivers. The host attachment logic surrounds the high speed signal processor module and enables modification of the signal processor data and instruction memories by a rapid transfer process known as a Cycle Steal Sequence. In addition, the signal processor running mode can be controlled and monitored by the host computer which serves as the primary "operator panel" of the signal processor.

BRIEF DESCRIPTION OF THE DRAWINGS

The invention will be more clearly understood from the following description in conjunction with the accompanying drawings, wherein:

FIG. 1 is a brief block diagram of a conventional speech recognition system;

FIG. 2 is a block diagram for explaining the operation of the acoustic processor of FIG. 1;

FIG. 3 is a diagram of the system architecture of the system according to the present invention;

FIG. 5 is a gain vs. bandwidth curve illustrating typical performance of the analog front end subsystem;

FIG. 6 is an illustration of the interface between the resident host I/O channel and MULTIBUS;

FIG. 17 is a diagram illustrating the input and output signals from the Cycle Steal Sequencer of FIG. 13;

FIGS. 23-25 illustrate the bit formats for the control register, status driver and interrupt register of the signal processor.

DETAILED DESCRIPTION OF THE PREFERRED EMBODIMENT

Figure 4:
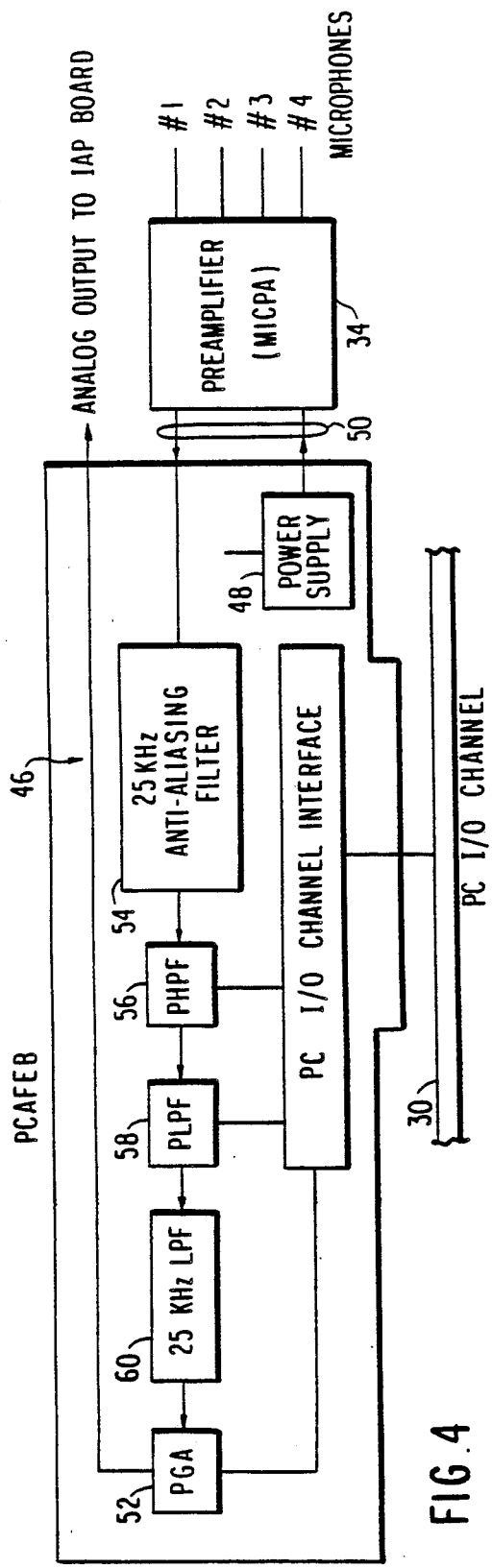
FIG. 4 is a functional block diagram of the analog front end subsystem portion of FIG. 3.

FIG. 3 is an overall functional block diagram of an acoustic processor according to the present invention. The present invention will be described with reference to a particular example wherein a Personal Computer, specifically the Personal Computer (PC) available from International Business Machines Corp., is used as the resident host for an SP-16 speech processor module, although it should be appreciated that other computers could be used and that the essential aspects of the invention are applicable as well to other signal processing applications, such as speech compression, data communication, biomedical signal processing, etc.

With reference to FIG. 3, the PC 24 is used as a local host for the SP-16 signal processor and also as a communication processor which ties together the speech work station 26, acoustic processor 14 and linguistic decoder 16. The linguistic decoder may be, e.g., a 4341 signal processor with two AP190 array processors. Communications between the resident host 24 and the 4341 main frame processor 16 are provided over an AlphaNumeric Release (ANR) link 28, whereas communications between the resident host 24 and speech work station are carried over a 9600 baud ASYNC link (not shown).

The speech signal picked up by the microphone 32 is first preamplified by a microphone pre-amplifier unit 34 and is then processed by a programmable gain/bandwidth subsystem located in the resident host main frame. The preconditioned signal is then digitized and buffered by the Intelligent Analog Peripheral (IAP) board 38, and segments of the digitized waveform are then transferred by the IAP to the signal processor data memory 40 via host attachment circuitry using a cycle steal data transfer technique. The Host Attachment Board (HAB) 42 contains circuitry required for generating the signal processor clocks and the appropriate control signals for accessing the signal processor data and instruction busses.

While the analog front end and ANR controller boards 35 and 36 reside in the resident host main frame, the IAP board 38, HAB 42 and SP board 62 may all be preferably located in a MULTIBUS chassis which conforms to the IEEE 796 bus standard. A two-board interface provides the required link between the resident host I/O channel and the MULTIBUS. Altogether, the acoustic processor according to this invention occupies four slots in a MULTIBUS cardcage and three slots in the resident host (e.g., IBM PC) mainframe.

The design and operation of the various components of the system in FIG. 3 will now be described in detail.

ANALOG FRONT END SUBSYSTEM

The Analog Front End Subsystem (AFES) is a programmable gain/bandwidth microphone signal conditioning unit used by the speech recognition system prior to signal digitization. The AFES consists of two main building blocks—a microphone preamplifier (MICPA) 34 followed by a programmable gain/bandwidth post amplifier 46. The preamplifier 34 is physically located near the microphone 32 (i.e., on the speech work station) whereas the post amplifier 46 resides in the acoustic processor resident host main chassis (i.e., the PC). For application in a multiple-microphone environment, the AFES preferably supports a number of identical analog signal conditioning channels.

FIG. 4 is a functional block diagram of one example of the analog front end subsystem. The pre-amplifier 34 is preferably a transformer-coupled preamplifier having extremely low noise and distortion characteristics. Its power handling capability (high input acceptance) ensures freedom from over-load by high output microphones.

The pre-amplifier may use a recording industry standard API 2520 operational amplifier in combination with a Jansen JE-110K-HPC microphone input transformer. The API 2520 operational amplifier is a high gain, wide band, direct coupled amplifier with differential input, designed specifically for audio amplifier applications. It features extremely low input bias current, low equivalent input noise and low total harmonic distortion. The microphone input transformer features a multiple interleaved layer winding design resulting in high level capability in low frequencies and extremely low distortion levels. Power may be supplied to the pre-amplifier module 34 via a 25-lead flat/twisted-pair cable 50 which also carries the preamplified signals to the analog front end board (PCAFEB) in the PC resident host. A 48-volt power supply 48 is provided for phantom powering of condenser microphones. The phantom power supply is built into the PC power supply sub-assembly.

Analog signals from the microphone pre-amplifier unit 34 are carried via the cable 50 to the programmable gain/bandwidth post amplifier in the PCAFEB, the programmable gain/bandwidth post amplifier in the preferred embodiment comprising a programmable gain amplifier 52 preceeded by a programmable bandwidth filter arrangement itself made up of a plurality of filters. At first, a 2-pole Butterworth low pass filter 54, e.g., an AF150 filter, is used to filter out the high frequency components of the wideband signal in order to eliminate aliasing of frequencies above half the sampling rate of the following switched capacitor filters. Immediately after the filter 54, the signal is high pass filtered by a five-pole Chebyshev high pass filter 56, e.g., a Reticon R5611 filter, with 30 db per octave rolloff and less than 0.6 db of passband ripple. The programmable high pass filter (PHPF) 56 has a cutoff frequency tunable by an external clock, which, in turn, is programmable by the PC processor via the PC I/O channel 30. The filter 56 is preferably programmable to have a cutoff frequency ranging from 32.5 to 302.3 Hz in 256 equally spaced steps.

Following the high pass filter 56 is a seven-pole, six zero elliptic low pass switched capacitor filter, e.g. a Reticon R5609 filter, with over 75 db out-of-band rejection and less than 0.2 db passband ripple. As with the filter 56, the programmable low pass filter (PLPF) 58 has a cutoff frequency tunable by the PC processor from 1.42 KHz through 12.46 KHz in 256 equally spaced steps. The DC offset of both of programmable filters 56 and 58 is adjustable to zero. The independently programmable cutoff frequencies of the filters 56 and 58 may be as shown in the following Table I, the Table showing only 32 steps with the intermediate steps being easily determined through interpolation.

TABLE 1

Analog Front End Board-Cutoff Frequency Settings

| Data (Hex) | L P Clock (KHz) | L P Cutoff Frequency (KHz) | H P Clock (KHz) | H P Cutoff Frequency (Hz) |
|---|---|---|---|---|
| 00 | 142.0 | 1.420 | 16.24 | 32.50 |
| 08 | 155.8 | 1.558 | 17.74 | 35.50 |
| 10 | 173.5 | 1.735 | 19.83 | 39.70 |
| 18 | 196.5 | 1.965 | 22.83 | 44.80 |
| 20 | 221.8 | 2.218 | 25.34 | 50.70 |
| 28 | 250.5 | 2.505 | 28.53 | 57.10 |
| 30 | 279.5 | 2.795 | 31.99 | 64.00 |
| 38 | 311.8 | 3.118 | 35.82 | 71.60 |
| 40 | 345.8 | 3.458 | 39.64 | 79.30 |
| 48 | 378.3 | 3.783 | 43.65 | 87.30 |
| 50 | 414.7 | 4.147 | 47.76 | 95.50 |
| 58 | 445.7 | 4.457 | 51.93 | 103.90 |
| 60 | 486.6 | 4.486 | 56.12 | 112.20 |
| 68 | 523.0 | 5.230 | 60.62 | 121.20 |
| 70 | 559.5 | 5.595 | 63.13 | 126.30 |
| 78 | 593.0 | 5.930 | 69.60 | 139.20 |
| 80 | 629.8 | 6.298 | 74.08 | 148.20 |
| 88 | 668.5 | 6.685 | 78.76 | 157.50 |
| 90 | 707.6 | 7.076 | 83.23 | 165.50 |
| 98 | 742.4 | 7.424 | 88.23 | 176.40 |
| A0 | 784.3 | 7.843 | 92.72 | 185.40 |
| A8 | 824.7 | 8.247 | 97.57 | 195.10 |
| B0 | 865.6 | 8.656 | 102.44 | 204.90 |
| B8 | 897.8 | 8.978 | 107.42 | 214.80 |
| C0 | 938.4 | 9.384 | 112.01 | 224.00 |
| C8 | 981.8 | 9.818 | 117.00 | 234.00 |
| D0 | 1017.5 | 10.175 | 122.07 | 244.10 |
| D8 | 1058.0 | 10.580 | 127.20 | 254.40 |
| E0 | 1096.4 | 10.964 | 132.11 | 264.20 |
| E8 | 1130.0 | 11.300 | 136.48 | 273.00 |
| F0 | 1178.0 | 11.780 | 141.88 | 283.80 |
| F8 | 1206.0 | 12.060 | 146.40 | 292.80 |
| FF | 1245.8 | 12.458 | 151.15 | 302.30 |

Removal of the clock residue from the filter signal at the output of filter 58 is performed by a two-pole Butterworth post filter, e.g. an AF150 filter. For an extreme case of a cutoff frequency of 100 Hz for the high pass filter 56, the corresponding switched capacitor filter sampling rate is 50 KHz. Thus, the cutoff frequency of the post filter 60 is set to half that rate, i.e., 25 KHz.

Prior to digitization by the data acquisition unit, i.e., the IAP board 38 in FIG. 3, the filtered signal is amplified by a programmable gain post amplifier 52. The amplifier 52 may, e.g., consist of an LH0086 amplifier which is a self-contained, high accuracy, digitally programmable-gain amplifier used in the inverting mode. The amplifier exhibits low offset voltage, high input impedance, high Power Supply Rejection Ratio (PSRR) and excellent gain accuracy and gain linearity. A three-bit TTL compatible digital input selects an accurate gain setting of 1, 4, 9, 19, 49, 99 or 199, with the gain programming information being as shown in Table 2.

A typical frequency response curve for the PCAFEB of FIG. 4 is shown in FIG. 5 for a speech bandwidth of 180 HZ to 9.5 KHz and a total gain of 65.6 db.

TABLE 2

PCAFEB Gain Programming Information

| Data (Hex) | Post Amplifier Gain | Total System Gain |
|---|---|---|
| 00 | Output at virtual ground | Output at virtual ground |
| 01 | 0 db | 40.0 db |
| 02 | 12.4 db | 52.4 db |
| 03 | 19.8 db | 59.8 db |
| 04 | 25.6 db | 65.6 db |
| 05 | 33.8 db | 73.8 db |
| 06 | 39.9 db | 79.9 db |
| 07 | 46.0 db | 86.0 db |

Generation of the filter clocks for the filters in FIG. 4 is performed in the PC-I/O channel interface 53 by two digital-to-frequency converters comprised of microprocessor-compatible digital-to-analog converters followed by voltage-controlled oscillators. The D/A converter may be an NE5019 8-bit D/A converter with its data input being latched from the PC I/O data bus 30 during a single OUT command. The voltage output from the D/A converter is then fed to a VCO, e.g., a 74LS624 oscillator, which provides the proper 50% duty-cycled trigger signal to the respective switched capacitor filter.

Setting the gain of the post amplifier 52 is similarly performed by latching the three least significant data bits of the PC I/O data bus into a quad latch, e.g., a 74LS375 latch. The latch outputs are optically coupled to the gain setting inputs of the programmable gain amplifier, the optical signal isolation providing ideal isolation of the analog signal path from the noisy digital circuitry.

Figure 11:
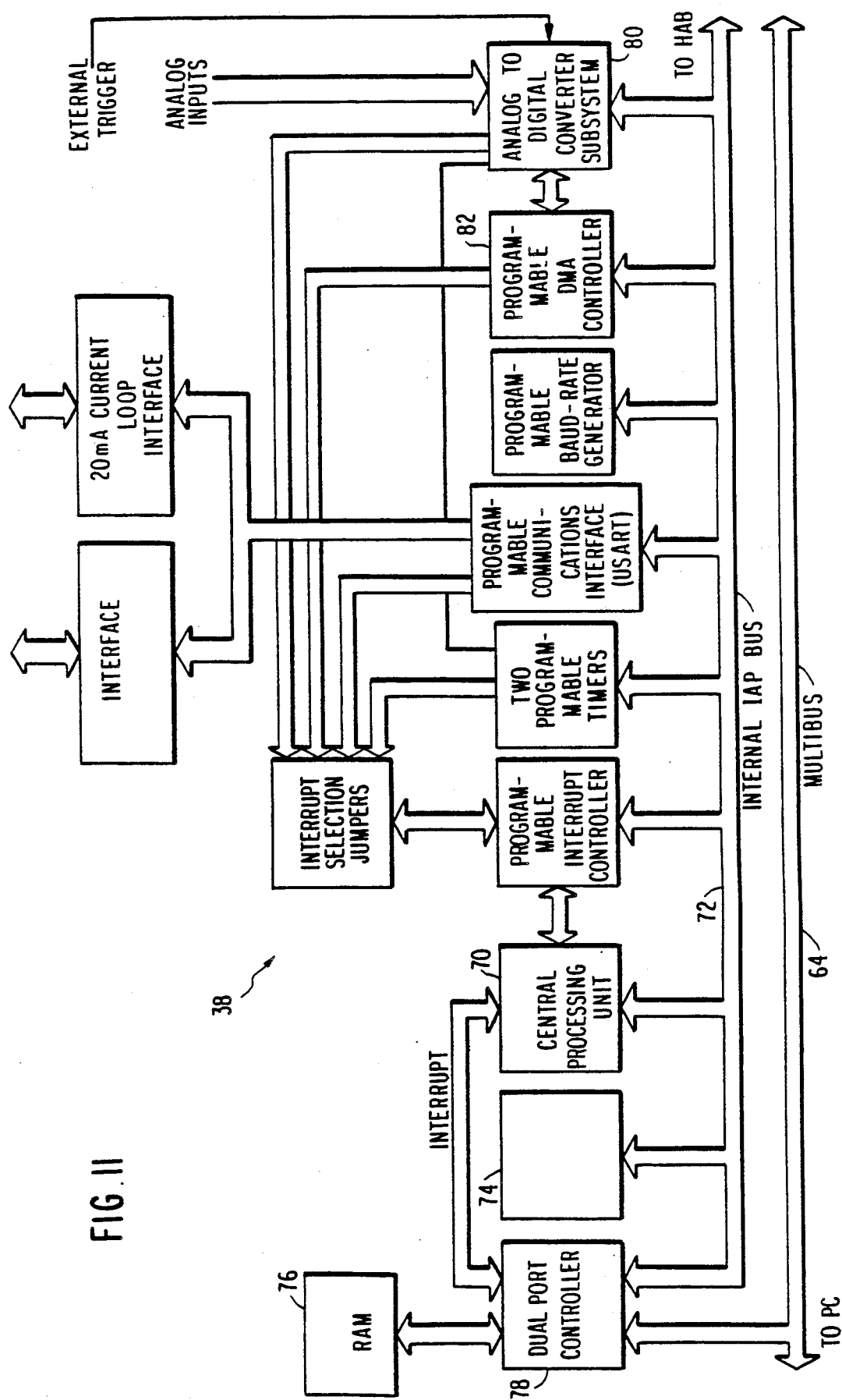
FIGS. 11(a)-(d) illustrate the resident host and IAP memory and I/O maps.
Figure 12A:
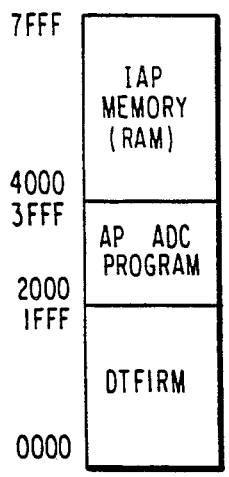
FIG. 12 is a timing diagram for explaining a data acquisition process.
Figure 12B:
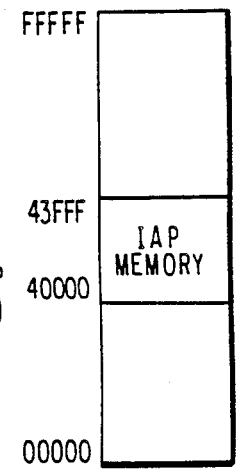
Figure 12C:
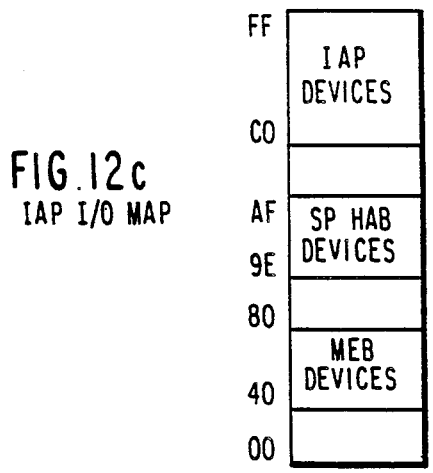
Figure 12D:
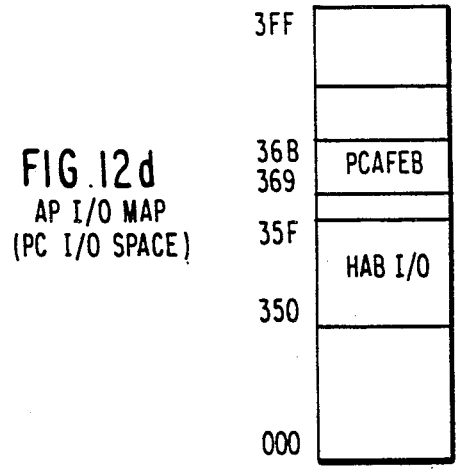

To the resident host processor 24, the analog front end board 35 is seen as three consecutive output ports having the addresses 369, 36A and 36B (where all addresses are in Hexadecimal), as shown in FIG. 11d, for the gain, low pass and high pass settings, respectively, with Tables 1 and 2 summarizing the cut-off frequency settings for the low and high pass filters and the gain programming information for the programmable gain amplifier 52.

For optimum noise rejection performance, isolated power busses can be provided on the board using, e.g., a PM862 DC/DC Converter module. The PC-generated 12-volt supply can be converted to a dual 15-volt supply, which, in turn, drives all of the analog circuitry on the PCAFEB and on the pre-amplifier module.

PC-TO-MULTIBUS INTERFACE

The PC 24 in FIG. 3 is used as a resident host for the front end portion of the acoustic processor. The PC 24 communicates with the data acquisition (IAP) board 38 and the signal processor (SP) board 62 of the acoustic processor over the MULTIBUS 64. The MULTIBUS may be of the type described in "iSBC 660 System Chassis Hardware Reference Manual", Intel Corp., Santa Clara, CA 95051, 1980, incorporated by reference herein. Two cards contain the logic for the resident host-to-MULTIBUS interface, with a card PCMBUS 65 in the resident host main unit communicating with a companion card MBUSPC 66 in the MULTIBUS cardcage over two twisted-pair flat cables as shown in FIG. 6. The cards 65 and 66 may simply comprise differential line drivers and receivers for sending and receiving signals between the two interface boards. These devices provide enhanced signal transmission on the twisted-pair of cables over relatively long distances.

The various signals exchanged between the cards 65 and 66 may be briefly described as follows.

Twenty address lines are sent to the MULTIBUS 64 from the PC I/O channel 30. Since the logic levels are reversed on the two busses, the MULTIBUS address receiver outputs are inverted on the MBUSPC board 66 to conform with MULTIBUS protocol. The inverting octal drivers are enabled with ALE_D, a delayed version of the Address Latch Enable (ALE) signal from the PC I/O channel which indicates the presence of a valid address on the PC bus. Addresses are latched with the falling edge of ALE.

Eight bidirectional data lines are connected between the cards 65 and 66. Since these lines are bidirectional, the proper driver or receiver must be enabled according to the operation occurring on the bus. In the preferred embodiment of this invention, the convention applied is to maintain the logic in WRITE mode until a memory or I/O read is issued, with WRITE mode being defined with respect to the PC as bus master (i.e., data are sent from the PC to the I/O device or memory over the MULTIBUS). READ mode implies that the bus is turned toward the PC.

Figure 7:
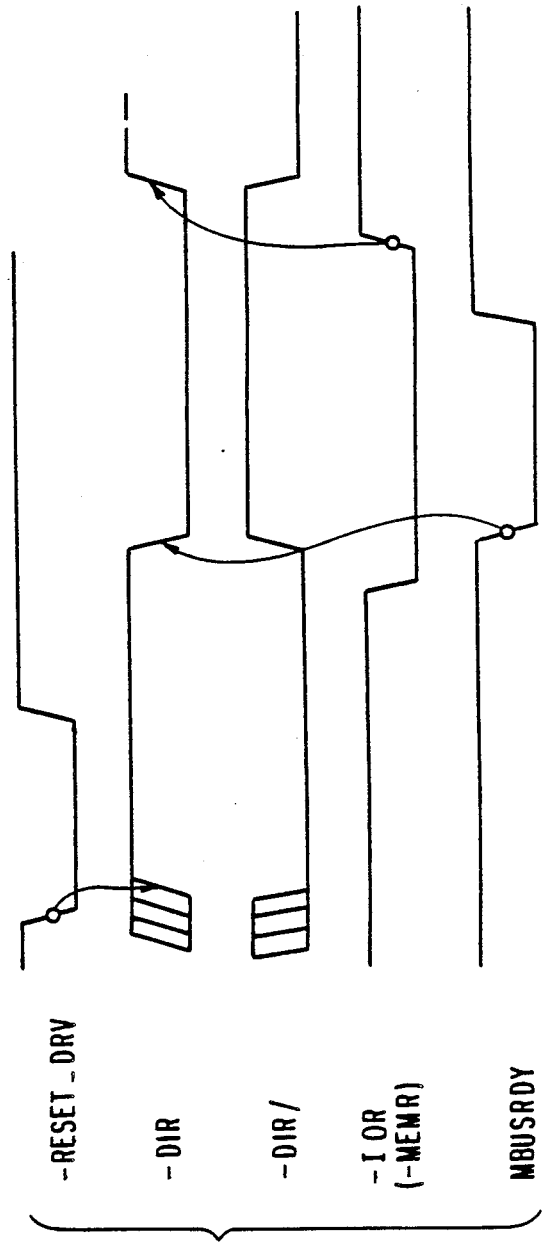
FIG. 7 illustrates signal waveforms for explaining data direction control in the interface of FIG. 6.

The DIR signal and its complement -DIR, both generated on the Host Attachment Board, control the direction of the bidirectional data lines, as is generally illustrated in FIG. 7. At initialization, DIR is asynchronously set high by -RESET_DRV, a PC initialization signal. This enables the drivers in WRITE mode, i.e., in the direction away from the PC and toward the card 66 in FIG. 6. Activation of an I/O Read (IOR) or Memory Read (MEMR) command enables the MBUSRDY line, and the active low MBUSRDY asynchronously resets DIR to a low state. This disables the drivers and forces their outputs to tri-state, thus placing the bus in the READ mode, i.e., in the direction toward card 65 from card 66 in FIG. 6.

The MBUSRDY line returning to a high level terminates the I/O or memory read operation, and the low-to-high transition of the command line synchronously sets DIR back to a high level, thus returning the bus to a WRITE mode.

Figure 8:
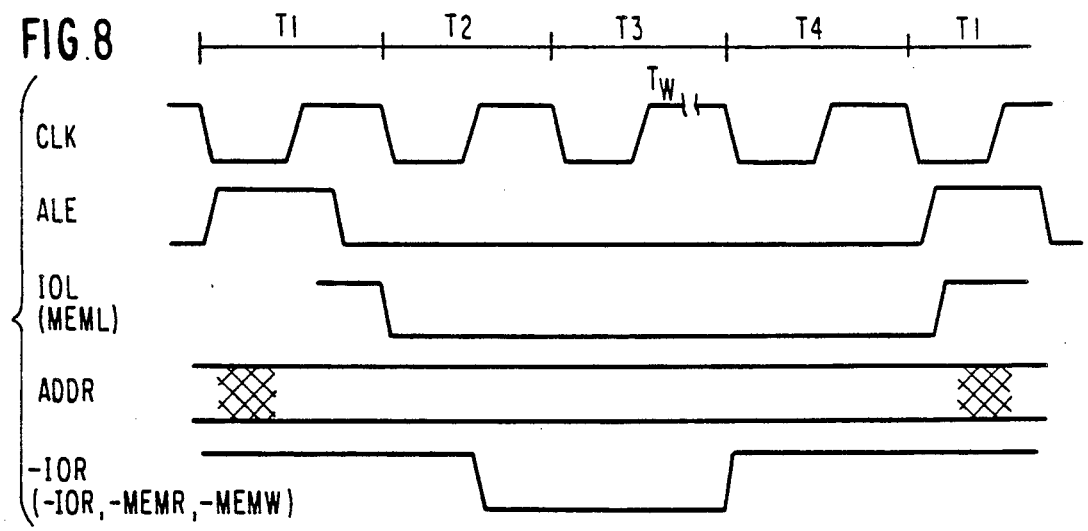
FIG. 8 illustrates signal waveforms for explaining the resident host system timing and control signals.

FIG. 8 illustrates the memory and I/O command line timing relative to the PC system clock. A memory read command or an I/O read command causes the memory or I/O device to drive it's data onto the data bus. Memory or I/O write commands instruct the memory or the I/O device to store the data present on the data bus. Both read and write commands are active low signals that can be driven by the PC processor or the PC DMA controller.

The command line receiver on the MBUSPC board 66 is enabled only when the Address Enable (AEN) line is low, indicating a normal, small, i.e., non-DMA, transfer on the bus. The active low IOL signal indicates that an address representing one of the I/O devices within the preselected I/O block on the MULTIBUS is read or written. The active low MEML signal indicates that the dual-ported RAM on the Intelligent Analog Peripheral (IAP) board (FIG. 10) has been accessed.

Figure 9:
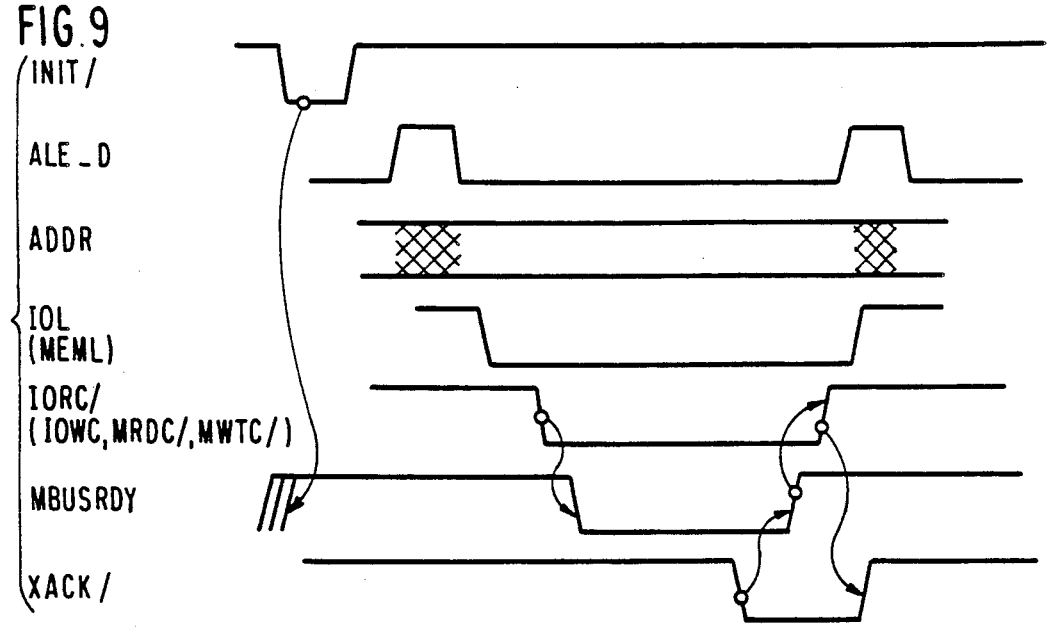
FIG. 9 illustrates signal waveforms for explaining the generation of the MBUSRDY signal.

With reference to FIG. 9, the MULTIBUS reset line is derived from the logical NOR of the PC initialization signal RESET_DRV (FIG. 7) and a MULTIBUS power-on-reset signal. Either one of these signals turning high produces the active low MULTIBUS INIT/ signal.

Six interrupt request lines are provided by the IBM PC I/O channel 30, but the interface in FIG. 6 may preferably carry only interrupt requests 2–4. Although most of the PC interrupt request lines are accounted for, interrupt requests 2–4 can be utilized with minimal program modifications. The request lines received on the PCMBUS board 65 are inverted and are driven via tri-state drivers which keep the request lines in high impedance until activated.

If a slow device, i.e., a device slower than the resident host, is attached to the I/O channel, it can halt the resident host processer by driving a normally high I/O CH RDY line (not shown) low upon detecting a valid address and a read command. Pulling this line low extends the resident host machine cycle by an integral number of clock cycles known as a wait state.

MBUSRDY, a signal generated on the MBUSPC board 66, is sent to the PCMBUS board 65 where it is connected via a tri-state buffer to the PC I/O CH RDY line. With reference to FIG. 9, at initialization, MBUSRDY is set high by the INIT/signal. When the memory address decode line MEML is asserted, and either a memory read command MRDC or a memory write command MWTC line is active, a flip-flop (not shown) is clocked and outputs a low level. This flip-flop will be hereinafter referred to as the memory FF. When the I/O address decode line IOL is asserted, and either I/O read command line IORC or an I/O write command line IOWC is active, a second flip-flop (not shown) is clocked and outputs a low level. This second flip-flop will be hereinafter referred to as the I/O FF. The MBUSRDY signal is the logical AND of the memory and I/O FF ouptputs. This signal, in turn, forces I/O CH RDY low, and halts the resident host processor.

Upon completion of a particular transfer, an XACK/ signal will be sent from a slave device to the bus master on the MULTIBUS. The active low XACK/ clears the memory and I/O flip-flops, thus returning MBUSRDY to a high level and releasing the resident host processor from its wait state. At the falling edge of the extended host clock, the command line, e.g., IORC returns high. This transition causes XACK/ to return to a high level, thus completing the transfer.

DATA ACQUISITION SUBSYSTEM (IAP)

The Intelligent Analog Peripheral (IAP) board 38 in FIG. 3 may preferably include a DT3752 IAP available from Data Translation and described in detail in "DT 3752-DT 3754 User Manual", document UM-00073-B-556, 1982, available from Data Translation, Marlborough, Mass., 01752, and incorporated by reference herein. The DT3752 IAP is a complete microprocessor-based single board computer, including (FIG. 10) 17K bytes of dual-ported RAM 76, 16K bytes of on-board ROM 74, a complete 8-level interrupt system 73, 75 with programmable vectoring, a programmable interval timer 77, full duplex serial I/O with RS232 interface 79, two undedicated DMA channels, and a complete multi-channel analog-to-digital converter 80, with DMA capability for high speed data acquisition. As an intelligent slave on the MULTIBUS, the IAP offers truly self-contained data acquisition, freeing the bus master, i.e., the resident host, from these high bus bandwidth tasks.

Figure 10:
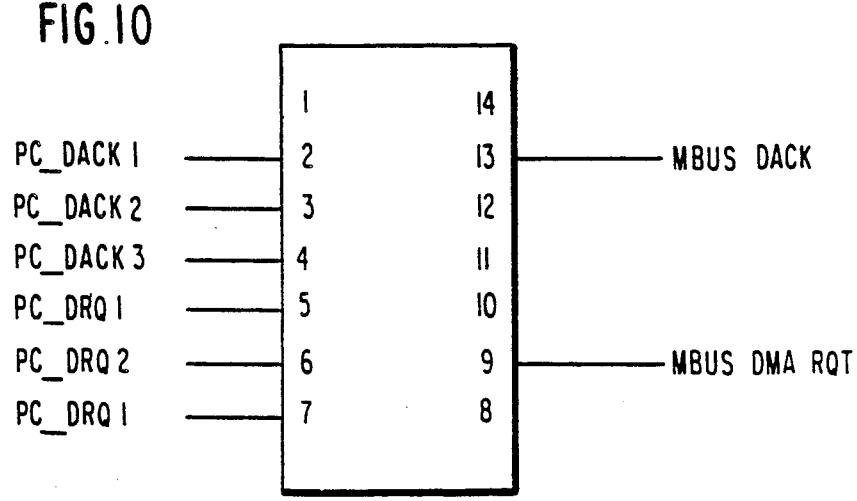
FIG. 10 is a block diagram of the Intelligent Analog Peripheral (IAP) board.
Figure 13:
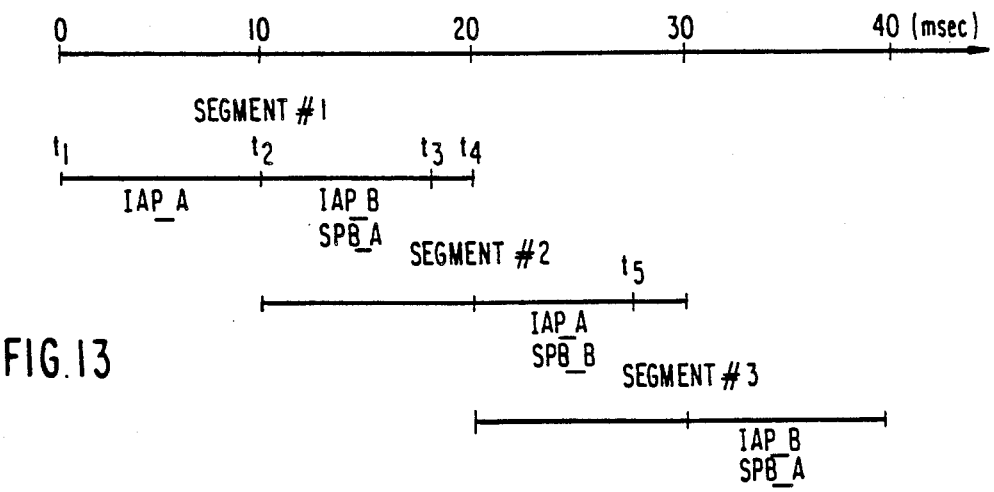
FIG. 13 is a block diagram of the Host Attachment board.

FIG. 10 is a block diagram of IAP 38 in FIG. 3. The IAP includes an 8085A central processing unit 70, and an on-board bus 72 over which all internal operations are performed. The bus consists of the 8085A 16 address lines, 8 data lines, interrupt lines and bus control lines. The bus 72 is completely independent of the MULTIBUS, allowing the on-board 8085A to operate in parallel without adding additional traffic on the host bus. This also implies that the IAP CPU has no way to gain control of the MULTIBUS, and is therefore precluded from ever becoming a bus master on the MULTIBUS. The IAP bus 72 is brought out on a 50-pin connector where it is connected to one input of the dual port controller (DPC) 90 in the host attachment board 42 (FIG. 13).

The read only memory 74 in the IAP of FIG. 10 includes four PROM devices installed in four sockets provided on the board. As shown in FIG. 11(a), the memory address space on the IAP bus 72 is partitioned such that the first 16K byte block (0000H-3FFFH) is dedicated to the ROM devices 74. The first 8K bytes of the ROM, address space (0000H-1FFFH) are dedicated to IAP firmware, as described in "DTFIRM User Manual", document UM-001424, 1981, Data Translation, Marlbourough, Mass., 01752, incorporated by reference herein, so that the user can have an 8K byte application program start at 2000H and occupy the address space of 2000H-3FFFH.

The IAP contains a 16K byte dual-ported dynamic RAM 76 with internal refresh. As shown in FIG. 10, the RAM 76 can be accessed independently by either the IAP bus 72 or MULTIBUS 64 via the dual-port arbitration logic 78. The arbitration is performed on a fixed priority scheme that gives memory refresh requests highest priority, followed by requests from the IAP bus 72 and finally by requests from the MULTIBUS 64 which have the lowest priority. The RAM addressing logic is so designed that the IAP bus 72 and MULTIBUS 64 can place a common memory block in different address spaces relative to each processor. To the 8085A, the dual-ported RAM appears as a contiguous block of 16K bytes starting at address 4000H, i.e., the RAM appears in the 4000H-7FFFH address space on the IAP bus 72. To the resident host, i.e., the PC, the dual-ported RAM appears as a contiguous block of 16K bytes starting at 40000H and occupying the 40000H-43FFFH address space of the PC, as shown in FIG. 11(b).

While the dual-ported RAM 76 presents a common area which the IAP bus 72 and MULTIBUS 64 may use for information interchange, it does not itself provide the complete communication mechanism needed for the bus interaction. For this kind of interaction, a single location, 4000H from the IAP bus 72 and 40000H from the PC, of the dual-ported RAM 76 is used as a flag/communication byte. Writing into this byte from either bus will generate a hardware interrupt request to the other bus. The interrupted processor can then read the contents of the flag byte to determine the nature of the request. If the exchange of information required is more than one byte worth, the software may dedicate a certain portion of the RAM as a message or parameter table area to which the remainder of the information can be passed. Thus, the hardware interrupt can simply be viewed as a call button which essentially gains the attention of the processors.

By using the I/O commands of the 8085A, the IAP 38 can access programmable devices on the IAP bus 72. The 8085A can address 192 external I/O devices that span the I/O address space from 00 to BFH, with the address space C0H to FFH being reserved for IAP devices, as shown in FIG. 11(c).

For acoustic processing applications, the data sampling rate exceeds the rate at which the 8085A processor 70 in FIG. 10 is capable of operating. Thus, a complete DMA system on the IAP bus 72 is utilized to acquire data and store it into RAM 76 at the true hardware speed of the A/D converter 80 without loading the signal processor 63 or the PC 24. The IAP includes a highly versatile multichannel DMA controller 82 to allow fast devices to access the IAP memory over the IAP bus 72 without any processor overhead. The DMA controller logic consists of four channels of DMA with each channel having a 16-bit auto-initialization address counter, a 16-bit auto-initialization word counter, a DMA request line and a DMA acknowledge line.

For a single microphone data acquisition, analog data is provided to the A/D converter subsystem 80 and is converted to digitized data. The digitized data is provided from single-ended A/D channel No. 1 at a rate of 25.6 Ksps. The digitized data are segmented over a 20 msec period with 50% overlap between segments, as shown in FIG. 12.

A typical data acquisition process will now be described with reference to the illustration in FIG. 12. At time $t_1$ in FIG. 12, the DMA process is started, and the data buffer portion of RAM 76 specified for channel A, i.e. IAP-A, is filled first. At time $t_2$ when the buffer IAP-A is filled, the DMA DONE A bit is set and the B-channel buffer IAP-B will start to fill without stopping the converter and without losing data. In response to the DMA DONE A bit, the 8085A performs a programmed I/O block transfer over the IAP bus 72 to the signal processor 63 via the Host Attachment 42 (note that the signal processor 63 must select the IAP as its local host for this transfer to be completed). At the end of the block transfer of data from the IAP-A to the buffer SPB-A in the data memory 40 on the signal processor board 62, the IAP asserts a READY flag at an IAP/SP common "mailbox" in the signal processor data memory 40. When the IAP-A buffer has been emptied at time $t_3$, an interrupt to the 8085A processor 70 is generated. This causes the 8085A to reset the DMA DONE bit, thus rearming channel A for another transfer.

When the buffer IAP-B is filled at time $t_4$, the DMA DONE B bit of the Status Register in the A/D converter 80 is set, and channel A is reactivated. The converter 80 again begins filling the buffer IAP-A while the processor 70 transfers the data from buffer IAP-B to an address allocated to the buffer B in the signal processor data memory 40. At time $t_5$, the signal processor 63 begins processing segment No. 1.

The above process is repeated until the signal processor interrupts the processor 70 and instructs it to stop data acquisition. Note that IAP buffers IAP-A and IAP-B are always mapped to signal processor buffers SPB-A and SPB-B, respectively.

For further details of the IAP interval timer, serial I/O system, interrupt system and A/D system, reference is made to the DT3752 User Manual cited above.

As an optional feature, the model DT3762 Multifunction Expander Board (MEB) available from Data Translation may be added to the IAP, thus providing the IAP with a variety of digital and analog functions not available on the IAP itself. The DT3752 communicates with the DT3652 via the IAP bus 72 and provides the user four 12-bit D/A converter channels, 48 general purpose, TTL compatible, digital I/O lines, five general purpose 16-bit counter/timers, a floating point arithmetic processor, and a serial I/O channel. All functions on the DT3762 board appear as 64 I/O devices on the IAP bus 72 with the base address of 40H as shown in FIG. 11(c). Note, however, that the MEB is an optional board which is not essential for speech recognition applications, although it may be useful during application development and monitoring processes. The MEB is described in detail in "DT3762 User Manual", Document UM-00113-D-557, 1980, Data Translation, Marlborough, Mass., 01752.

HOST ATTACHMENT BOARD

FIG. 13 is a general block diagram of the Host Attachment Board (HAB) 40. The HAB board 42 includes circuitry for controlling the signal processor 63 on the signal processor board and for monitoring its status, in addition to logic facilitating fast access to the signal processor data and instruction memories 40 and 41 via a cycle steal sequence. The dual port controller (DPC) logic 90 selects either the IAP or the PC as a resident host for the signal processor 63. The signal processor 63, via the host attachment, is viewed by the selected resident host as 18 consecutive I/O devices. The DPC 90 provides the appropriate I/O address decoding and generates the various control signals for the host attachment registers and drivers. The host attachment 92 can be viewed as a buffer between the "slow" host bus and the "fast" signal processor busses. The signal processor clock generator finite state machine 94 provides the clock signals for running, stopping and halting the signal processor module 63. The cycle steal sequencer (CSS) 96 contains the control/timing logic for data transfers between the selected host and the signal processor memories.

Figure 14:
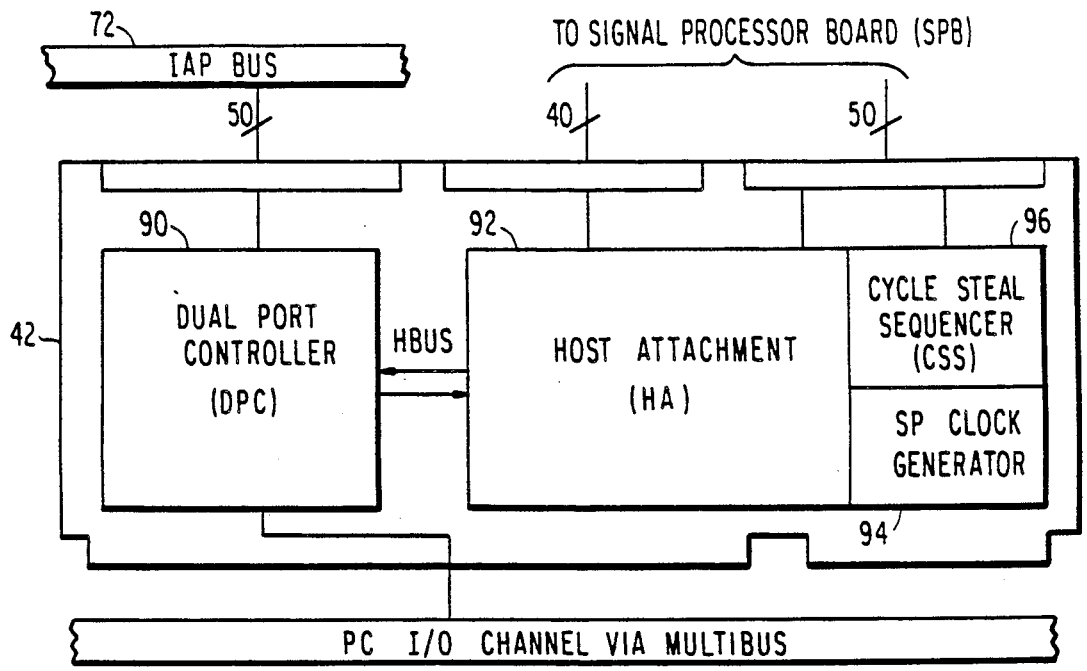
FIG. 14 is a diagram of the interface between the signal processor 63 and Host Attachment.

Although the host attachment 92 and signal processor 63 are on different boards, the interconnection between the two components is as illustrated in FIG. 14, with the host attachment "surrounding" the signal processor standardized engine, the "standardized engine" comprising the SP-16 processor, four data and instruction busses and a number of TTL modules necessary for receiving and sending the signals illustrated in FIG. 3 as being coupled to the standardized engine 62. The HDAT data lines are connected to a set of registers and drivers which facilitate access to the signal processor data and instruction memories 40 and 41, respectively, and each of the registers and drivers is controlled by a command line generated by the DPC 90.

Three registers, i.e., an 8-bit interrupt register 102, a 16-bit input register 104 and a 16-bit output register 106, provide parallel I/O ports for the signal processor 63. Control and status transfer between the HDAT and the standardized engine is provided by a control register 108 and status driver 110.

Figure 15:
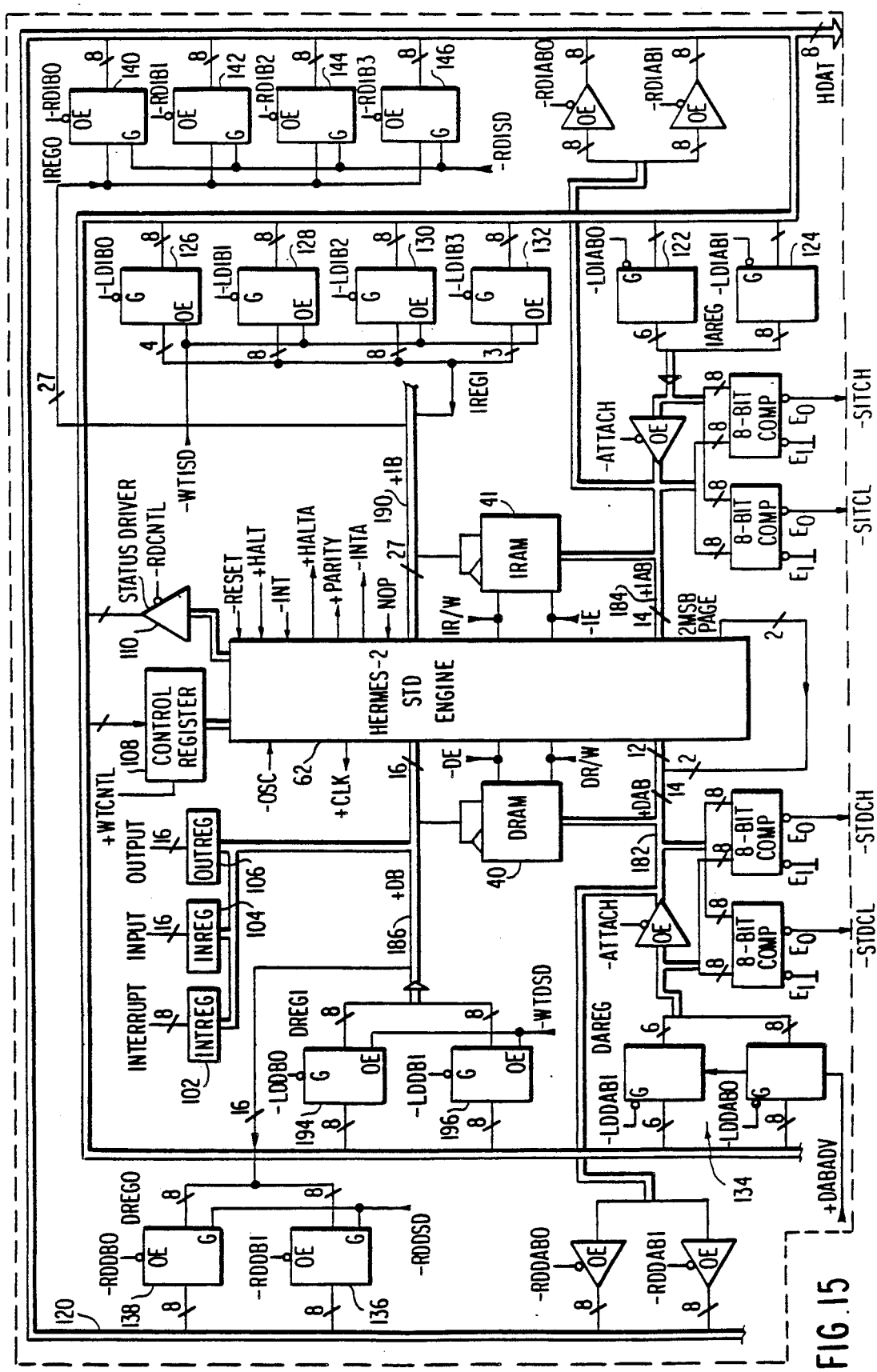
FIG. 15 is a diagram of the Dual Port Controller on the Host Attachment board 42.

The dual port controller (DPC) 90 is shown in more detail in FIG. 15 as including a host selector 112, host port decoder 114 and inverter 116. The host selector 112 is a multiplexer which provides access to the signal processor Host Attachment circuitry either by the PC via the MULTIBUS 64 or by the IAP bus 72. The data lines from either the IAP or the PC are selected to form the 8-bit bidirectional HDAT which communicates with the host attachment register/drivers.

The SPSEL signal 118 (the LSB of the signal processor interrupt register 102), selects the desired host. At initialization, the PC is selected as the host by default. Interrupt request lines are connected directly to each host in order to provide a direct "call for attention" from the signal processor 63 to either host.

Ten PC address lines MADDR0/-MADDR9/ and eight IAP address lines IADDR0-OADDR7 are selected by the host selector 112. Since the signal processor 63 is seen by the host as a set of I/O ports, only the I/O read and write command lines from the PC and the IAP are selected. The port decoder 114 uses the address and command lines from the selected host to decode the individual load/ read control lines sent to the host attachment registers/drivers.

In order to interrupt the signal processor 63, the selected host issues a specific OUT command (port 35FH from the PC and port AOH from the IAP) which, in turn, is decoded by the port decoder 114 to set an interrupt flip-flop (not shown) in the standardized engine. This flip-flop is reset by the signal processor interrupt acknowledge line INTA, asserted when the signal processor 63 begins servicing its interrupt request.

To conform with the MULTIBUS data exchange protocol, every I/O operation from the PC in the DPC I/O range generates an acknowledge signal MXACK/ which indicates to the PC that a read or write transfer to or from the signal processor has been completed. FIG. 15 illustrates in detail the DPC host selector/port decoder signal paths with the PC/MULTIBUS lines being designated with an M prefix while the IAP lines are designated with an I prefix.

The host attachment circuitry comprises a set of registers/drivers facilitating access to the signal processor data and instruction busses and memories. The registers/drivers are loaded/read byte sequentially over the 8-bit bidirectional HDAT bus 120 and are individually controlled via signals generated by the DPC port decoder 114.

Accessing a location in instruction memory (IRAM) 41 is accomplished by the host over the HDAT bus 120 in seven host I/O operations. First, a byte of data is latched into the 8-bit register 122 by the −LDIAB0 line asserted by the port decoder 114, the register 122 comprising the least significant part of the host attachment instruction address register (IAREG) which is formed by registers 122 and 124. A second byte of data is then transferred from the host and latched into the most significant part of the host attachment instruction address register, i.e., the register 124, by the −LDIAB1 signal. The instruction address can then be read back to the host by the −RDIAB0 and −RDIAB1 commands.

Once the instruction address has been latched, the instruction data may be read by activating a read Cycle Steal Sequence (CSS). After the memory location has been accessed and its contents registered, four I/O read operations must be performed to transfer the 27-bit wide instruction word one byte at a time to the host. A write sequence is similar except that the four data bytes must be stored in the Instruction Input Register (IREGI) prior to the write CSS, the instruction input register IREGI comprising four 8-bit registers 126-132 in FIG. 14. The data memory (DRAM) 40 is accessed in the same manner as the instruction memory 41, with the exception that fewer I/O transfer operations to or from the host are required for the 16-bit wide data word. The host attachment data address register (DAREG) 134 is implemented as a binary up/down counter and is unique in that, once loaded, its contents can be incremented or decremented without requiring any load control signal from the host. This method enables fast data block transfer between the signal processor data memory 40 and its resident host.

Since the host may want to read the data/instruction busses when the signal processor 63 is "stopped," asserting the STOP signal automatically latches the content of these busses into the data output register (DREGO) and instruction output register (IREGO) which are comprised of 8-bit registers 136 and 138 and 8-bit registers 140-146, respectively. The host may then issue the appropriate read commands to enable the contents of these registers onto the HDAT bus. In addition, the host can HALT the processor after STOP, hence enabling Cycle Steal Read/Write from or to its memories after reading the bus status.

During a debugging process, the user can stop the signal processor 63 at a predefined address of the signal processor instruction address register IAR or data address register DAR. To this end, addresses of the host attachment DAREG 134 and IAREG 122, 124 are compared with those of the signal processor IAR or DAR, respectively. Upon reaching an address match, the corresponding match signals are asserted, i.e., -STICL, -STICH, -STDCL, or -STDCH. These signals, along with the respective enable lines, will cause the signal processor 63 to enter the STOP mode. At this point in time, the signal processor busses can be read and then let float by the cycle steal sequences.

Table III below lists the 29 distinct I/O commands decoded by the port decoder 114 that control the host attachment and CSS logic. Note that, due to polarity inversion between the IAP and MULTI-busses, the same command is decoded from a different I/O address depending on the selected host. The port decoder 114 may be implemented as a programmed logic array, the programming for which is set forth in Tables IV-VI.

TABLE III

HOST ATTACHMENT - I/O PORT ADDRESS ASSIGNMENT

| CTL LINE | DESCRIPTION | HOST I/O | Port Address PC | IAP |
|---|---|---|---|---|
| —LDDAB0 | Load 1st (LS) byte of data—address to DAREG register | OUT | 350H | AFH |
| —LDDAB1 | Load 2nd (MS) byte of data—address to DAREG register | OUT | 351H | AEH |
| —RRDDSH | Request a READ from the Data Store | OUT | 352H | ADH |
| —RDDB0 | Read 1st (LS) byte of the 16—bit data word by the HDAT | IN | 353H | ADH |
| —RDDB1 | Read 2nd (MS) byte of the 16—bit data word by the HDAT | IN | 354H | ABH |
| —LDDB0 | Load 1st (LS) byte of the 16—bit data word from the HDAT | OUT | 353H | ACH |
| —LDDB1 | Load 2nd (MS) byte of the 16—bit data word from the HDAT | OUT | 354H | ABH |
| —RDDAB0 | Read 1st (LS) byte of data—address bus by the HDAT | IN | 350H | AFH |
| —RDDAB1 | Read 2nd (MS) byte of data—address bus by the HADT | IN | 351H | AEH |
| —RWTDSH | Request a WRITE to Data Store | OUT | 357H | A8H |
| —LDIAB0 | Load 1st (LS) byte of instruction address to IAREG from the HDAT | OUT | 355H | AAH |
| —LDIAB1 | Load 2nd (MS) byte of instruction address to IAREG from the HDAT | OUT | 356H | A9H |
| —RRDISH | Request a READ from Instruction Store | OUT | 35DH | A2H |
| —RDIB0 | Read 4th (MS) byte of the 27—bit instruction word by HDAT | IN | 358H | A7H |
| —RDIB1 | Read 3rd byte of the 27—bite instruction word by HDAT | IN | 369H | A6H |
| —RDIB2 | Read 2nd byte of the 27—bite instruction word by HDAT | IN | 35AH | A5H |
| —RDIB3 | Read 1st (LS) byte of the 27—bit instruction word by HDAT | IN | 35BH | A4H |
| —RWTISH | Request a WRITE to Instruction Store | OUT | 35EH | A1H |
| —RDIAB0 | Read 1st (LS) byte of instruction—address bus by the HDAT | IN | 355H | AAH |
| —RDIAB1 | Read 2nd (MS) byte of instruction—address but by the HDAT | IN | 356H | A9H |
| —RDCNTL | Read the SP status byte by HDAT | IN | 35CH | A3H |
| +WTCNTL | Load a control byte into the SO control register | OUT | 35CH | A3H |
| —INT | Interrupt the signal processor | OUT | 35FH | A0H |
| —IRAMR | Reset IRAM line | OUT | 360H | 9FH |
| —IRAMS | Set IRAM line | OUT | 361H | 9EH |

TABLE IV

PORT DECODER PAL CODES

PAL12L10 - U66

| Pin | I | 1 | HADDR0 |
| Pin | I | 2 | HADDR1 |
| Pin | I | 3 | HADDR2 |
| Pin | I | 4 | HADDR3 |
| Pin | I | 5 | HADDR4 |
| Pin | I | 6 | HADDR5 |
| Pin | I | 7 | HADDR6 |
| Pin | I | 8 | HADDR7 |
| Pin | I | 9 | HDACK |
| Pin | I | 10 | HIOWRC/ |
| Pin | I | 11 | HIORDC/ |
| Pin | I | 13 | E1 |
| Pin | O | 23 | RDDAB0/ |
| Pin | O | 22 | LADDAB0/ |
| Pin | O | 21 | RDDAB1/ |
| Pin | O | 20 | LDDAB1/ |
| Pin | O | 19 | PD_RRDDSH/ |
| Pin | O | 18 | PD_RWTDSH/ |
| Pin | O | 17 | PD_RDDB0/ |
| Pin | O | 16 | PD_LDDB0/ |
| Pin | O | 15 | PD_RDDB1/ |
| Pin | O | 14 | PD_LDDB1/ |
| Pin | | 24 | Vcc |
| Pin | | 12 | GND |

TABLE IV-continued
PORT DECODER PAL CODES

OUTPUTS:
```
RDDAB0/   = −HADDR0 * −HADDR1 * −HADDR2 * −HADDR3 * HADDR4 * −HADDR5 * HADDR6 *
            −HADDR7 * −HDACK * −HIORDC/ * E1
LDDAB0/   = −HADDR0 * −HADDR1 * −HADDR2 * −HADDR3 * HADDR4 * −HADDR5 * HADDR6 *
            −HADDR7 * −HDACK * −HIOWRC/ * E1
RDDAB1/   = −HADDR0 * −HADDR1 * −HADDR2 * −HADDR3 * HADDR4 * −HADDR5 * HADDR6 *
            −HADDR7 * −HDACK * −HIORDC/ * E1
LDDAB1/   = HADDR0 * −HADDR1 * −HADDR2 * −HADDR3 * HADDR4 * −HADDR5 * HADDR6 *
            −HADDR7 * −HDACK * −HIOWRC/ * E1
PD_RRDDSH/ = −HADDR0 * HADDR1 * −HADDR2 * −HADDR3 * HADDR4 * −HADDR5 * HADDR6 *
            −HADDR7 * −HDACK * −HIOWRC/ * E1
PD_RWTDSH/ = HADDR0 * HADDR1 * HADDR2 * −HADDR3 * HADDR4 * −HADDR5 * HADDR6 *
            −HADDR7 * −HDACK * −HIOWRC/ * E1
PD_RDDB0/ = HADDR0 * HADDR1 * −HADDR2 * −HADDR3 * HADDR4 * −HADDR5 * HADDR6 *
            −HADDR7 * −HDACK * −HIORDC/ * E1
PD_LDDB0/ = HADDR0 * HADDR1 * −HADDR2 * −HADDR3 * HADDR4 * −HADDR5 * HADDR6 *
            −HADDR7 * −HDACK * −HIOWRC/ * E1
PD_RDDB1/ = −HADDR0 * −HADDR1 * HADDR2 * −HADDR3 * HADDR4 * −HADDR5 * HADDR6 *
            −HADDR7 * −HDACK * −HIORDC/ * E1
PD_LDDB1/ = −HADDR0 * −HADDR1 * HADDR2 * −HADDR3 * HADDR4 * −HADDR5 * HADDR6 *
            −HADDR7 * −HDACK * −HIOWRC/ * E1
```

TABLE V
PORT DECODER PAL CODES

PAL12L10 - U72
```
Pin   I    1   HADDR0
Pin   I    2   HADDR1
Pin   I    3   HADDR2
Pin   I    4   HADDR3
Pin   I    5   HADDR4
Pin   I    6   HADDR5
Pin   I    7   HADDR6
Pin   I    8   HADDR7
Pin   I    9   HDACK
Pin   I   10   HIOWRC/
Pin   I   11   HIORDC/
Pin   I   13   E1
Pin   O   23   RDIAB0/
Pin   O   22   LDIAB0/
Pin   O   21   RDIAB1/
Pin   O   20   LDIAB1/
Pin   O   19   RRDISH/
Pin   O   18   RWTISH/
Pin   O   17   RDIB0/
Pin   O   16   LDIB0/
Pin   O   15   RDIB1/
Pin   O   14   LDIB1/
Pin       24   Vcc
Pin       12   GND
```
OUTPUTS:
```
RDIAB0/  = HADDR0 * −HADDR1 * HADDR2 * −HADDR3 * HADDR4 * −HADDR5 * HADDR6 * −HADDR7 *
           −HDACK * −HIORDC/ * E1
LDIAB0/  = HADDR0 * −HADDR1 * HADDR2 * −HADDR3 * HADDR4 * −HADDR5 * HADDR6 * −HADDR7 *
           −HDACK * −HIOWRC/ * E1
RDIAB1/  = −HADDR0 * HADDR1 * HADDR2 * −HADDR3 * HADDR4 * −HADDR5 * HADDR6 * −HADDR7 *
           −HDACK * −HIORDC/ * E1
LDIAB1/  = −HADDR0 * HADDR1 * HADDR2 * −HADDR3 * HADDR4 * −HADDR5 * HADDR6 * −HADDR7 *
           −HDACK * −HIOWRC/ * E1
RRDISH/  = HADDR0 * −HADDR1 * HADDR2 * HADDR3 * HADDR4 * −HADDR5 * HADDR6 * −HADDR7 *
           −HDACK * −HIOWRC/ * E1
RWTISH/  = −HADDR0 * HADDR1 * HADDR2 * HADDR3 * HADDR4 * −HADDR5 * HADDR6 * −HADDR7 *
           −HDACK * −HIOWRC/ * E1
RDIB0/   = −HADDR0 * −HADDR1 * −HADDR2 * HADDR3 * HADDR4 * −HADDR5 * HADDR6 * −HADDR7 *
           −HDACK * −HIORDC/ * E1
LDIB0/   = −HADDR0 * −HADDR1 * −HADDR2 * HADDR3 * HADDR4 * −HADDR5 * HADDR6 * −HADDR7 *
           −HDACK * −HIOWRC/ * E1
RDIB1/   = HADDR0 * −HADDR1 * −HADDR2 * HADDR3 * HADDR4 * −HADDR5 * HADDR6 * −HADDR7 *
           −HDACK * −HIORDC/ * E1
LDIB1/   = HADDR0 * −HADDR1 * −HADDR2 * HADDR3 * HADDR4 * −HADDR5 * HADDR6 * −HADDR7 *
           −HDACK * −HIOWRC/ * E1
```

TABLE VI
PORT DECODER PAL CODES

PAL12L10 - U87
```
Pin   I    1   HADDR0
```

TABLE VI-continued
PORT DECODER PAL CODES

| Pin | I | 2 | HADDR1 |
|---|---|---|---|
| Pin | I | 3 | HADDR2 |
| Pin | I | 4 | HADDR3 |
| Pin | I | 5 | HADDR4 |
| Pin | I | 6 | HADDR5 |
| Pin | I | 7 | HADDR6 |
| Pin | I | 8 | HADDR7 |
| Pin | I | 9 | HDACK |
| Pin | I | 10 | HIOWRC/ |
| Pin | I | 11 | HIORDC/ |
| Pin | I | 13 | E1 |
| Pin | O | 23 | RDIB2/ |
| Pin | O | 22 | LDIB2/ |
| Pin | O | 21 | RDIB3/ |
| Pin | O | 19 | RDCNTL/ |
| Pin | O | 18 | WRCNTL/ |
| Pin | O | 17 | IRAMR/ |
| Pin | O | 16 | IRAMS/ |
| Pin | O | 15 | XACK/* |
| Pin | O | 14 | INT/* |
| Pin |   | 24 | Vcc |
| Pin |   | 12 | GND |

OUTPUTS:
RDIB2/ = −HADDR0 * HADDR1 * −HADDR2 * HADDR3 * HADDR4 * −HADDR5 * HADDR6 * −HADDR7 * −HDACK * −HIORDC/ * E1
LDIB2/ = −HADDR0 * HADDR1 * −HADDR2 * HADDR3 * HADDR4 * −HADDR5 * HADDR6 * −HADDR7 * −HDACK * −HIOWRC/ * E1
RDIB3/ =   HADDR0 * HADDR1 * −HADDR2 * HADDR3 * HADDR4 * −HADDR5 * HADDR6 * −HADDR7 * −HDACK * −HIORDC/ * E1
LADIB3/ =   HADDR0 * HADDR1 * −HADDR2 * HADDR3 * HADDR4 * −HADDR5 * HADDR6 * −HADDR7 * −HDACK * −HIOWRC/ * E1
RDCNTL/ = −HADDR0 * −HADDR1 * HADDR2 * HADDR3 * HADDR4 * −HADDR5 * HADDR6 * −HADDR7 * −HDACK * −HIORDC/ * E1
WRCNTL/ = −HADDR0 * −HADDR1 * HADDR2 * HADDR3 * HADDR4 * −HADDR5 * HADDR6 * −HADDR7 * −HDACK * −HIOWRC/ * E1
IRAMR/ = −HADDR0 * −HADDR1 * −HADDR2 * −HADDR3 * −HADDR4 * HADDR5 * HADDR6 * −HADDR7 * −HDACK * −HIOWRC/ * E1
XACK/* =                                           HADDR4 * −HADDR5 * HADDR6 * −HADDR7 * * −HIORDC/ * E1
INT/* =   HADDR0 * HADDR1 * HADDR2 * HADDR3 * HADDR4 * −HADDR5 * HADDR6 * −HADDR7 * −HDACK * −HIOWRC/ * E1

In the above tables, E1 is a combination of HADDR8 and HADDR9.

Figure 16:
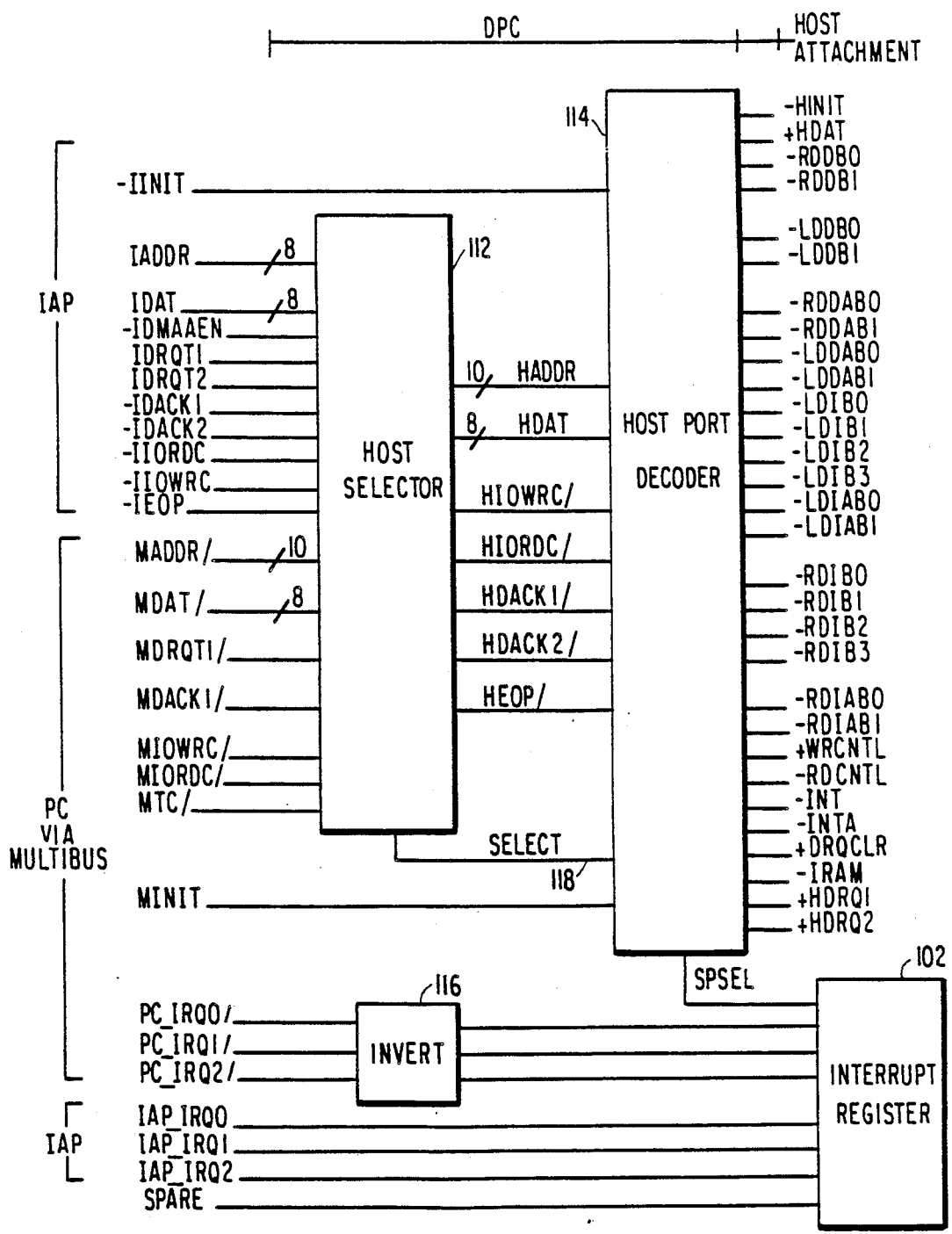
FIG. 16 is a diagram of the clock generator of FIG. 13.

The signal processor clock generator 94 in FIG. 13 is illustrated in more detail in FIG. 16. The clock generator 94 is comprised of four D-type flip-flops 150–156 and ten gates which together constitute a Finite State Machine (FSM). Positive transitions of the main system clock +OSC cause state transitions in the FSM. State signal +CLK at the output of flip-flop 156 oscillates at the instruction rate. If the signal processor 63 is neither reset nor stopped nor halted, the FSM makes transitions between states (CLKR=1, CLKT=0, HLTA=0) and (CLKR=0, CLKT=1, HLTA=0). Non-overlapping signal processor clock signals A_CLK, B_CLK and C_CLK are derived from CLKR by inverters 160, 162 and 164 and AND gates 166, 168 and 170. For normal operation, C_CLK must be activated, and switch 172 is in its open position. Under this condition, CLKR will be reproduced at the output of gate 168 C_CLK and will be reproduced in inverted form at the output of gate 170 as B_CLK, with gate 166 being disabled. For LSSD operation, switch 172 is closed to disable gate 168 and instead enable 166 to provide CLKR at its output as A_CLK.

The system clock +OSC is delayed by 15 nanoseconds in delay unit 172 and then combined with the B_CLK signal in AND gate 174 to generate the signal CLKBD. If, during the second half of an instruction cycle, the signals -CE_I/O or -CE_RAM (not shown) generated by the signal processor 63 are low, CLKBD activates the data memory access control line -DE and opens the bi-directional data bus buffers in the direction indicated by the signal +DR/−W generated by the signal processor 63.

If the interface line -STOP is low, the processor is "stopped" in state (CLKR=0, CLKT=0, HALTA=0), and all tristate output lines remain valid. The -STOP line can be used, e.g., to synchronize the processor with a slower memory by "cycle expansion," or to implement unconditional or conditional stopping.

The processor is "halted" if the -HALT line is low and the finite state machine was in state (CLKR=0, CLKT=1, HALT=0). Depending on the state of the interface line -STOP, "halting" occurs in two ways:

If -STOP is high, a transition occurs to state (CLKR=1, CLKT=0, HALTA=1). In this case, a new instruction cycle is started by CLKR going high, but immediately thereafter all tri-state outputs will be forced into a high-impedance state by +HALTA being high. External devices can then perform direct memory access operations on both memories as long as +HALTA remains high. If -HALT is returned to high, a transition to state (CLKR=1, CLKT=0, HALTA=0) occurs. Processor operation continues without any further transition of CLKR at this time.

If -STOP is low and -HALT is low, the FSM enters state (CLKR=0, CLKT=0, HALTA=0), i.e., the processor is "halted" without starting the next instruction cycle. Consequently, if -HALT is again put high, the FSM must return to the "stopped" state via state (CLKR=0, CLKT=0, HALT=0). This intermediate state is required in order to re-execute the last instruction during a full instruction time.

If the interface line -CLR is activated, i.e., is made low, the clock generator-finite state machine of FIG. 16 is asynchronously set to state (CLKR=0, CLKT=0, HALTA=1) by clearing all of flip-flops 150-156. All tri-state outputs are immediately forced to a high-impedance state. A three-stage shift register 176, which is clocked by the signal B_CLK, is also reset and presents a low level to the -RESET input of the signal processor 63.

When the interface line -CLR goes high, the FSM of FIG. 16 begins making transitions. Eventually, this leads to positive transitions of the signal B_CLK. This, in turn, shifts a high level signal into the three-stage shift register 176. The input pin -RESET of the signal processor 63 remains low during the first two positive transitions of $B_{13}$ CLK, and only then turns high. Thus, the signal processor 63 is forced to fetch the instruction at address 0000 twice.

CYCLE STEAL SEQUENCER

The cycle steal sequencer 96 in FIG. 13 will now be described with reference to FIGS. 17-20. Cycle steal provides the host a means of accessing the signal processor 63 data and instruction memories 40 and 41, respectively, by halting the signal processor 63 for no more than four machine cycles. The signals driven to the sequencer and those generated by the sequencer are illustrated in FIG. 17. The instruction memory cycle steal sequence is started when the cycle steal logic detects either the RRDISH (request read of instruction store) or RWTISH (request write to instruction store), I/O commands generated by the host port decoder as defined above in Tables III and IV. The data memory cycle steal sequence is started when the cycle steal logic detects either the RRDDSH (request read of data store) or RWTDSH (request write to data store) I/O commands also generated by the host port decoder.

Figure 18:
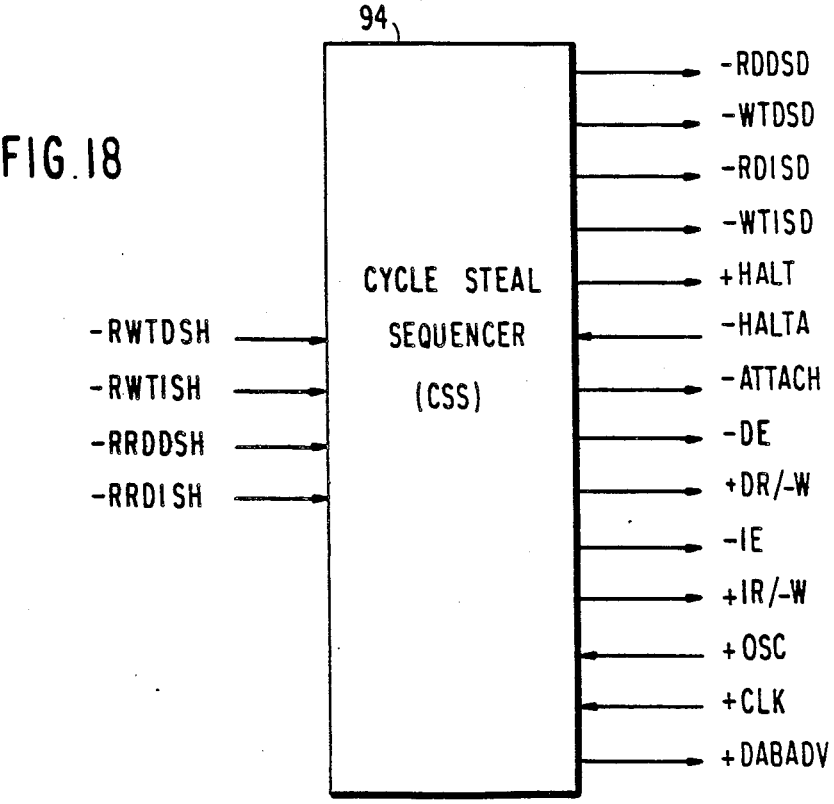
FIG. 18 illustrates signal waveforms for explaining a cycle steal read access to the signal processor data or instruction memories.

The sequencer 96 is implemented as a state machine clocked by +OSC, i.e., the system clock oscillating at twice the instruction rate. The sequencer remains in a stable initial state until one of the cycle steal I/O commands is detected. As shown in FIG. 18, when either of the signals -RRDDSH or -RRDISH are detected, the cycle steal sequencer 96 asserts the +HALT line at the positive transition of +OSC, which forces the signal processor 63 to complete the current instruction cycle, start the next cycle and halt. The signal processor 63 standardized engine acknowledges the HALT request by asserting -HALTA at the next positive +OSC clock transition, indicating that all busses are in a high-impedance state. Upon detecting -HALTA, the sequencer 96 asserts the -ATTACH line which connects the DAREG or IAREG outputs to the corresponding address busses 182 or 184, respectively, in FIG. 14. The asserted -ATTACH signal enables a tri-state driver that carries the data enable and read/write control lines for the data/instruction memories. These control lines are asserted by the corresponding cycle steal command and are stable sometime before the -ATTACH line is asserted. For example, for a DMA access to the data store 40 in FIG. 14, the signal waveforms of FIG. 18 illustrate that, upon the negative transition in the -HALTA signal, the data address bus DAB 182 and the data bus DB 186 are placed in a high-impedance state while the data enable line -DE and data read/write signal +DR/—W are also placed in a high-impedance state. Upon assertion of the -ATTACH signal, the signal -DE is asserted low to enable the output of the point, the host can perform the required I/O read operations which access the data from either the DREGO 136, 138 or the IREGO 140-146.

Figure 19:
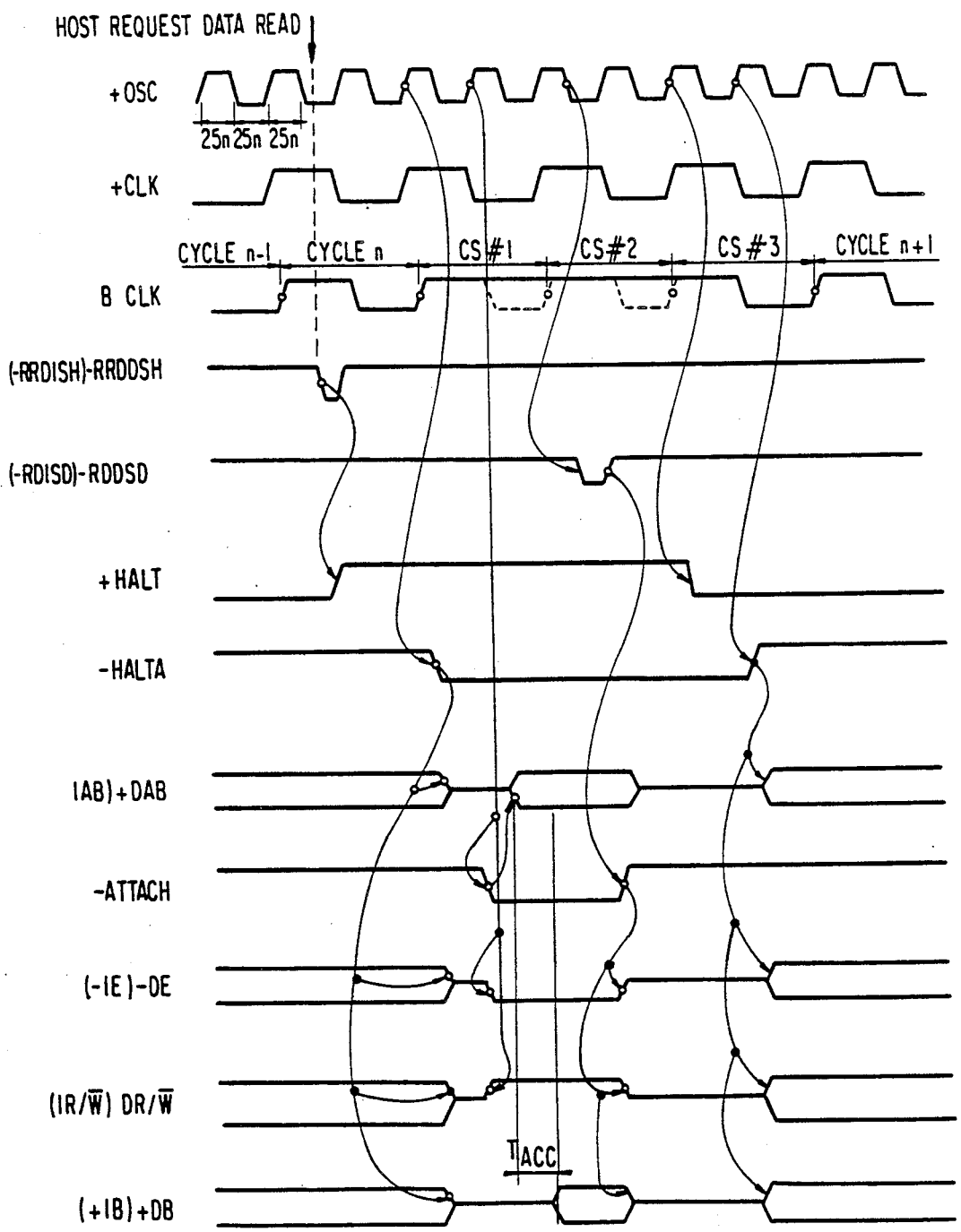
FIG. 19 illustrates signal waveforms for explaining a cycle steal write access to the data or instruction memories of the signal processor.

A cycle steal write sequence is essentially the same as that described above for the read sequence, except that the write control lines +DR/—W or +IR/—W are asserted low for a memory write operation. FIG. 19 provides a detailed timing diagram of the write cycle steal operation.

Figure 20:
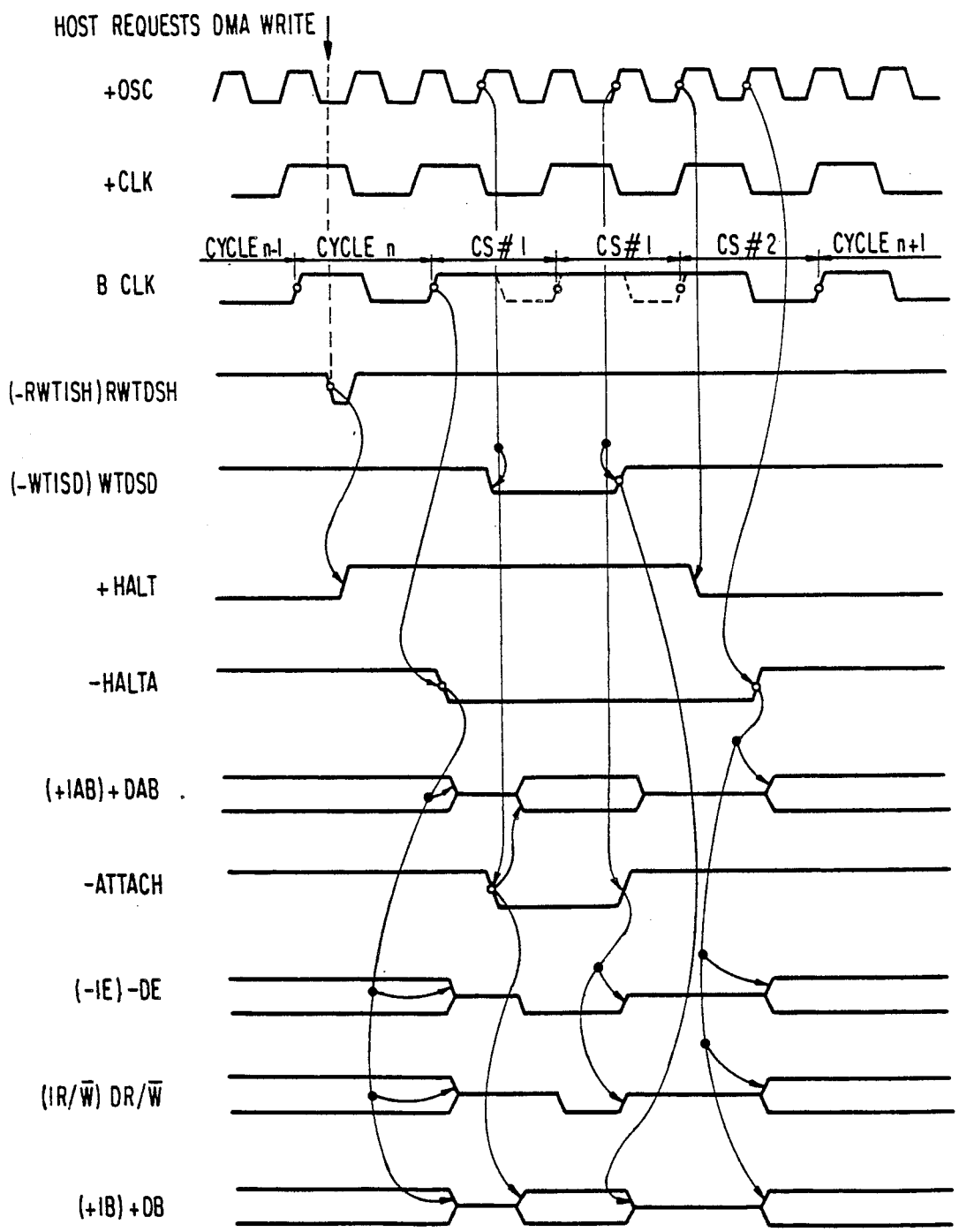
FIG. 20 is a flow chart and state diagram explaining the operation of the Cycle Steal Sequencer.

FIG. 20 illustrates an Algorithmic State Machine (ASM) describing the implementation of the CSS 96. The signal HINIT generated by the host port decoder 114 in FIG. 15 is received by the sequencer 96 and sets the state machine to an initial state $q_0$. When one of the RWT or RRD cycle steal I/O commands illustrated in FIG. 17 is received by the sequencer 96, and assuming the signal -HALTA is high, the sequencer 96 advances to state $q_1$ where the +HALT line is asserted and the cycle steal sequence is begun. The sequencer then waits for the signal processor 63 to acknowledge the HALT signal by asserting -HALTA, which should occur at the end of Cycle n in FIG. 19. Upon detecting the -HALTA signal, the sequencer 96 decodes the nature of the cycle steal I/O command, i.e., a write request -RWTDSH or -RWTISH or a read request -RRDDSH or -RRDISH. If it is a read command, the state machine advances to state $q_3$ where the +HALT and -ATTACH signals are both asserted, the latter occurring, for example, at the positive transition in +OSC in the center of CS#1 in FIG. 18. The state machine then advances to state $q_4$ where the HALT, ATTACH and RD_SD signals are all asserted. The assertion of the RD_SD signal results in the assertion of the -DE and +DR/—W signals in FIG. 18, followed by the assertion of the signal -RDDSD.

When a cycle steal sequence to or from the DRAM 40 is activated, the signal DABADV is generated at the end of the cycle steal sequence to increment the Data Address Register (DAREG) 134 for the next cycle steal sequence. The sequencer then checks to see if the read or write cycle steal I/O commands are still active and, if not, returns to the initial state $q_0$.

For a write operation, the state machine goes to state $q_7$ from state $q_2$ and additionally asserts the WT_SD signal. This results in generation of either the -WTDSD or -WTISD in FIG. 19 (Note that these signals in FIG. 19 are of a longer duration than the -RDISD and -RDDSD signal in FIG. 18 and are generated at the same rising transition in +OSC as the -ATTACH signal.) The state machine then advances to state $q_8$ in which the EN_WT signal is generated, thus resulting in assertion of the appropriate write command signals.

The state table of FIG. 20 describes the state definitions and the output signals generated by the sequencer 96. The logic for this asynchronous state machine is incorporated in a single programmable logic array, the programming for which may be as described in the following Table VII.

TABLE VII

HOST ATTACHMENT BOARD (HAB) - CYCLE STEAL SEQUENCER PAL CODE

PAL 16R8 (U81)

TABLE VII-continued
HOST ATTACHMENT BOARD (HAB) - CYCLE STEAL SEQUENCER PAL CODE

```
#PIN I   1  OSC
#PIN I   2  -HINIT
#PIN I   3  -HALTA
#PIN I   4  RRD
#PIN I   5  RWT
 PIN I   6
 PIN I   7
 PIN I   8
 PIN I   9
 PIN I  11
#PIN O  19  -HALT
#PIN O  18  -ATTACH
#PIN O  17  -RD_SD
#PIN O  16  -WT_SD
#PIN O  15  -EN_WT
#PIN O  14  -DABADV
#PIN O  13  -DECODE1
 PIN O  12
OUTPUTS:
-HALT
    =  -HALT * -ATTACH * -RD_SD * -WT_SD * -DABADV * -DECODE1 * -HINIT * -HALTA *   RRD
    + -HALT * -ATTACH * -RD_SD * -WT_SD * -DABADV * -DECODE1 * -HINIT * -HALTA *   RWT
    +  HALT * -RD_SD * -WT_SD * -DABADV * -DECODE1 * -HINIT
    +  HLAT * -ATTACH * -RD_SD * -ST_SD * -DABADV *  DECODE1 * -HINIT * -HALTA
    +  HALT * -ATTACH * -RD_SD * -WT_SD * -DABADV *  DECODE1 * -HINIT *  HALTA * -RWT
    +  HALT *  ATTACH *  RD_SD * -WT_SD * -DABADV * -DECODE1 * -HINIT
    +  HALT *  ATTACH * -RD_SD *  WT_SD * -DABADV *  DECODE1 * -HINIT *  HALTA *  RWT;
-ATTACH
    =  HALT * -ATTACH * -SD_SD * -WT_SD * -DABADV *  DECODE1 * -HINIT *  HALTA * -RWT
    +  HALT *  ATTACH * -RD_SD * -WT_SD * -DABADV * -DECODE1 * -HINIT
    +  HALT * -ATTACH * -RD_SD * -WE_SD * -DABADV *  DECODE1 * -HINIT *  HALTA *  RWT
    +  HALT *  ATTACH * -RD_SD *  WT_SD * -DABADV * -DECODE1 * -HINIT;
-RD_SD
    =  HALT *  ATTACH * -RD_SD * -WT_SD * -DABADV * -DECODE1 * -HINIT;
-WT_SD
    =  HALT * -ATTACH * -RD_SD * -WT_SD * -DABDAV *  DECODE1 * -HINIT *  HALTA *  RWT
    + HLAT *  ATTACH * -RD_SD *  WT_SD * -DABDAV * -DECODE1 * -HINIT;
-EN_WT
    =  HALT *  ATTACH * -RD_SD *  WT_SD * -DABADV * -DECODE1 * -HINIT;
-DABADV
    =  HALT *  ATTACH *  RD_SD * -WT_SD * -DABAVD * -DECODE1 * -HINIT
    +  HALT *  ATTACH * -RD_SD *  WT_SD * -DABADV *  DECODE1 * -HINIT;
-DECODE1
    =  HALT * -ATTACH * -RD_SD * -WT_SD * -DABADV * -DECODE1 * -HINIT
    +  HALT * -ATTACH * -RD_SD * -WT_SD * -DABADV *  DECODE1 * -HINIT * -HALTA
    +  HALT * -ATTACH * -RD_SD * -WT_SD *  DABADV * -DECODE1 * -HINIT
    + -HALT * -ATTACH * -RD_SD * -WT_SD * -DABADV *  DECODE1 * -HINIT                *  RRD
    + -HALT * -ATTACH * -RD_SD * -WT_SD * -DABADV *  DECODE1 * -HINIT                *  RWT
    +  HALT *  ATTACH * -RD_SD * -WT_SD * -DABADV *  DECODE1 * -HINIT;
END:
q0  = -HALT * -ATTACH * -RD_SD * -WT_SD * -DABADV * -DECODE1 * -HINIT
q1  =  HALT * -ATTACH * -RD_SD * -WT_SD * -DABADV * -DECODE1 * -HINIT
q2  =  HALT * -ATTACH * -RD_SD * -WT_SD * -DABADV *  DECODE1 * -HINIT
q3  =  HALT *  ATTACH * -RD_SD * -WT_SD * -DABADV *  DECODE1 * -HINIT
q4  =  HALT *  ATTACH *  RD_SD * -WT_SD * -DABADV * -DECODE1 * -HINIT
q5  =  HALT * -ATTACH * -RD_SD * -WT_SD *  DABADV * -DECODE1 * -HINIT
q6  = -HALT * -ATTACH * -RD_SD * -WT_SD * -DABADV *  DECODE1 * -HINIT
q7  =  HALT *  ATTACH * -RD_SD *  WT_SD * -DABDAV * -DECODE1 * -HINIT
q8  =  HALT *  ATTACH * -RD_SD *  WT_SD * -DABDAV *  DECODE1 * -HINIT
```

A signal processor direct memory access sequence for writing to the data memory or reading from the data memory via the host DMA channel will now be described with reference to FIGS. 21 and 22, although it should be noted that in the preferred embodiment transfers to or from the data memory are performed via programmed I/O. A host DMA transfer request to or from the signal processor data memory 40 is done by a dummy write by the signal processor 63 to the signal processor address 8 (or 9). This, in turn, sets a DMA Request flip-flop which signals the host that the signal processor 63 requires a DMA transfer. The host acknowledges this request by asserting its corresponding DACK line (e.g., -IDACK1, -IDACK2 or MDACK1 in FIG. 15), followed by the required transfer. When the transfer is complete, the host sends an end of process signal (MTC/or -IEOP in FIG. 15) which clears the HDRQ flip-flop.

Figure 21:
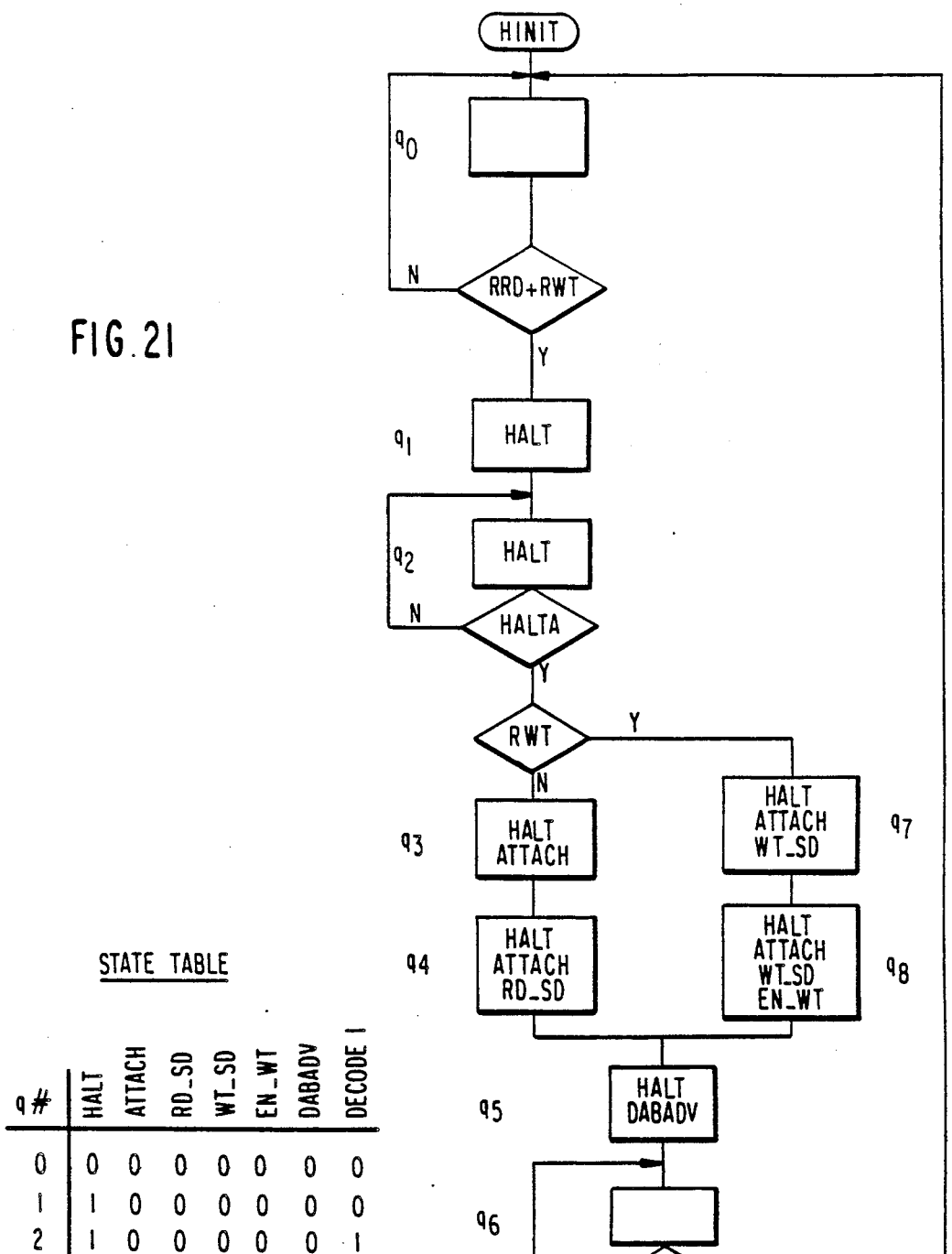
FIG. 21 illustrates signal waveforms for explaining a DMA write from the resident host to the signal processor data store 40.
Figure 22:
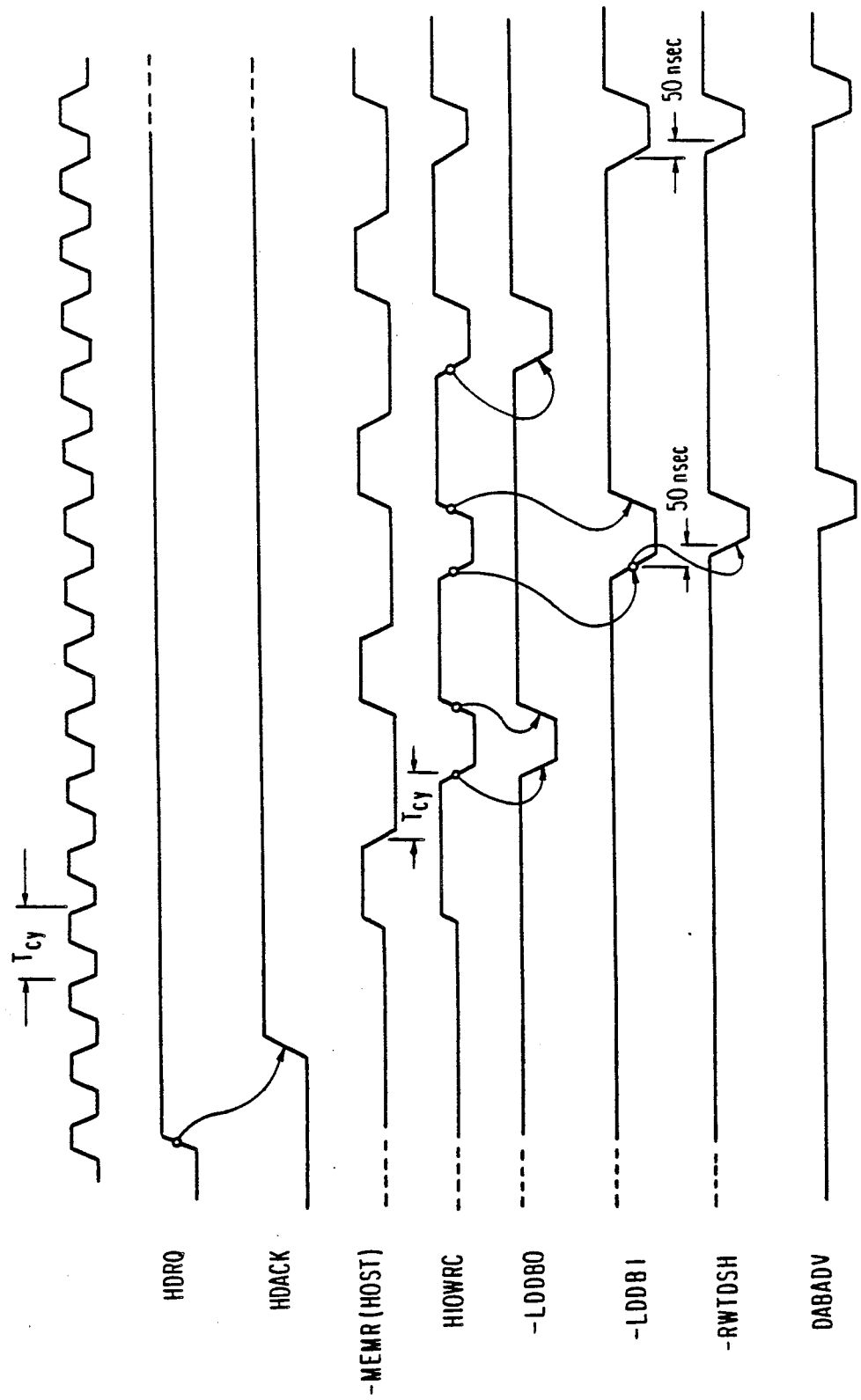
FIG. 22 illustrates signal waveforms for explaining a DMA read by the resident host of data in the signal processor data store 40.

Referring now to FIG. 21, that Figure illustrates the timing of a host-to-signal processor DMA transfer wherein data is written into the signal processor data store 40. In order to write to the data memory 40, the host DMA controller generates a memory read command to read from the host memory, i.e., -MEMR, followed by an I/O write command. The DMA transfer logic on the host attachment board 42 detects the first I/O write and generates the signal -LDDB0 which loads the least significant byte into register 194 of the data input register DREGI in FIG. 14. The next host I/O write generates the signal -LDDB1 which loads the most significant byte of data into the register 196 of the DREGI in FIG. 14. After an appropriate delay, e.g., 50 nsec, the cycle steal request line -RWTDSH is asserted, and the cycle steal sequence is started with data being stored at the data memory address set up at the start of the DMA operation. At the end of the cycle steal sequence, the DABADV signal clocks the data address register DAREG 134 in FIG. 14 in preparation for the next DMA cycle steal transfer. DMA operation continues until the host end of process signal is received.

DMA reads of the signal processor data memory 40 are performed in a manner similar to DMA writes. The timing diagram of FIG. 22 illustrates a DMA read sequence, and no detailed description of FIG. 22 is believed to be necessary.

Figure 23:
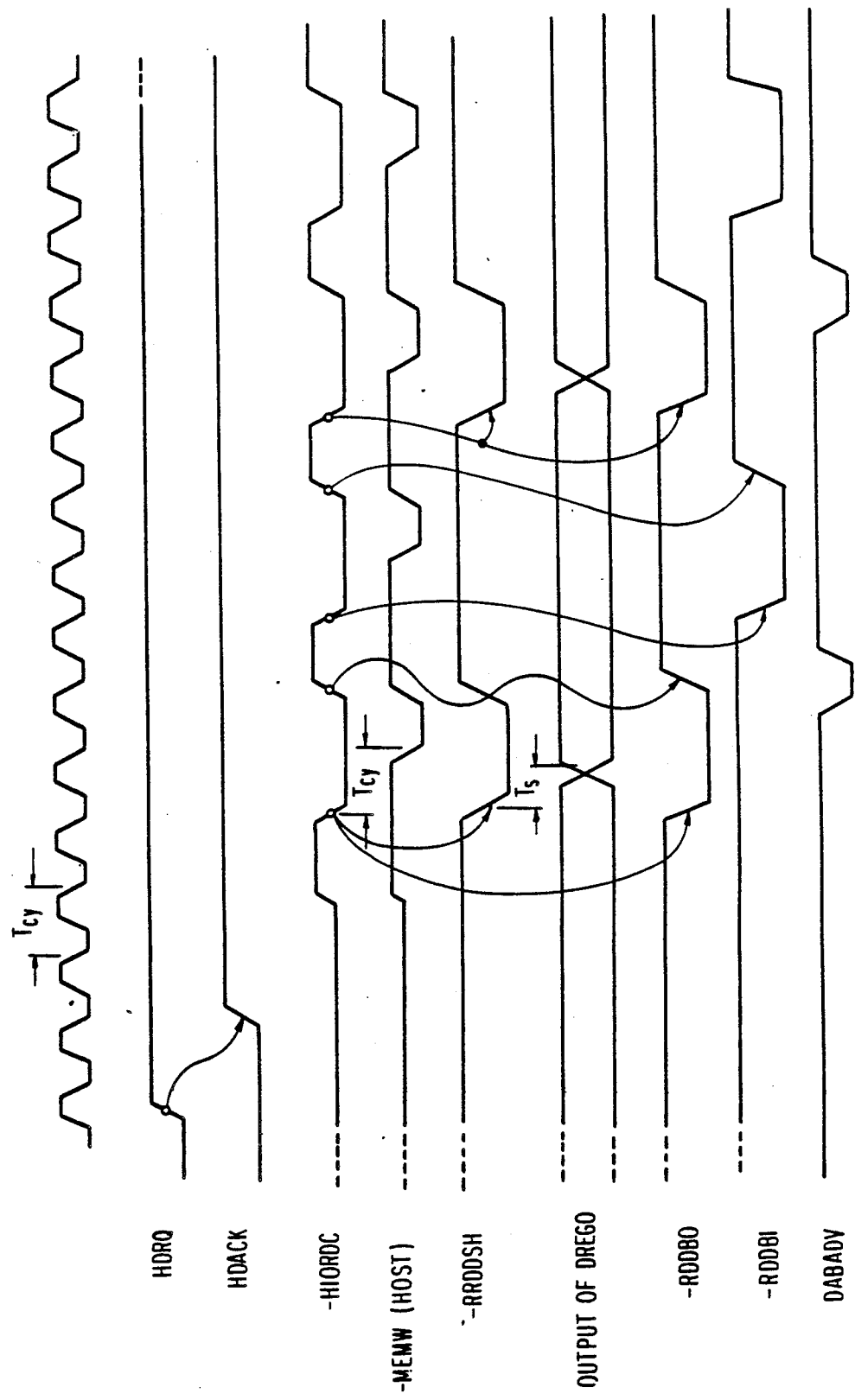

The signal processor standardized engine 63 in FIG. 14 may be controlled by the selected host via the standardized engine control register 108 located on the Host Attachment board 42. The PC can load this register by an OUT command to address 35CH, and the IAP can do the same by addressing A3H. The register bit format is as illustrated in FIG. 23 with the meaning of the various bit positions being as follows:

MRESET: "1"=Resets the SP and keeps it in the RESET state.

HALT: "1"=Halt at the beginning of he next cycle and float the busses.

NOP: "1"=Instructions are not executed but the processor IAR is incremented.

STIAB: "1"=Stop the SP when the IAB matches a predefined instruction address (all busses are valid).

SDABR: "1"=Stop the SP when the DAB during a read cycle matches a predefined data address (all busses are valid).

STOP: "1"=Stop the SP unconditionally (all busses are valid).

SDABW: "1"=Stop the SP when the DAB during a write cycle matches a predefined data address (all busses are valid).

RESUME: "1"=Along with STOP=1 provides single stepping of the SP.

For a single step operation, it should be noted that both the STOP and RESUME bits must be set to "1".

The status of the standardized engine 63 in FIG. 14 can be read by the selected host via the Status Driver 110. When the PC is acting as host, it can read the status by an IN command from address 35CH, and the IAP, when acting as the selected host, can read the status by an IN command from address A3H. The bit format of the Status Driver is as shown in FIG. 24, with the meaning of the various bit positions being as follows:

PARITY: "1"=IRAM parity error occurred while scanning with NOP line asserted.

STOP: "0"=The SP is in the STOP mode.

HALT: "0"=HALT mode was requested.

HALTA: "0"=The SP is in the HALT mode and the busses are floating.

INTA: "0"=The SP is running an Interrupt Service Routine.

LSSD_OUT: Output of the LSSD bit string.

INT: "0"=An external interrupt was requested.

CLR: "0"=SP is in the RESET mode and all busses are in Tri-State.

The signal processor interrupt register 102 in FIG. 14 is an eight-bit output port addressed by the signal processor 63 via a store operation to address OAH. The bit format for the register 102 is as illustrated in FIG. 25, with the meaning of the various bit positions being as follows:

SPSEL:
1=select the IAP as resident host.
0=select the PC as a resident host.

IAP_IRQ0: 1=interrupt the IAP at the highest priority level.

IAP_IRQ1: 1=interrupt the IAP at the mid priority level.

IAP_IRQ2: 1=interrupt the IAP at the lowest priority level.

PC_IRQ0: 1=interrupt the PC at the highest priority level.

PC_IRQ1: 1=interrupt the PC at the mid priority level.

PC_IRQ2: 1=interrupt the PC at the lowest priority level.

A DMA transfer to or from the signal processor 63 and the PC can be requested via a dummy write to the signal processor address 08H. A similar request for the IAP is performed via a dummy write to the signal processor address 09H. A dummy write, for example, is the instruction SXM DMAPC, where DMAPC is assigned the value of 08H.

A 16-bit data value can be loaded in the output register 106 by a store operation to address 0BH. The output lines of the register 106 are permanently enabled and can be used by an external device at will.

An external 16-bit parallel data can be read by a read command from the address 0BH, e.g., LMX INREG, where INREG is assigned the value of 0BH. The input data to this register must be loaded ahead of any signal processor read from this address, since loading of the input register 104 is done by an external data source lowering the -INLE input line for a period greater than 50 nsec.

SIGNAL PROCESSOR BOARD (SPB)

The signal processor board 62 contains a signal processor module enhanced by a set of bus drivers which facilitate direct memory access to the processor memories. The board 62 includes the 16K word DRAM 40 and an 8K word IRAM 41. In addition, the board 62 includes a voltage regulator 67 for providing the necessary voltage supplies for the processor.

The signal processor 63 is preferably a singlechip processor of the type described by G. Ungerbock et al, "SP-16 Signal Processor," International Conference On Acoustic Speech And Signal Processing 1984. In one instruction cycle, the signal processor 63 performs the following functions:

Instruction prefetching and data address generation;
20-bit ALU operation (other than multiplication), as required by the instruction fetched during the previous cycle;
Transfer of 16-bit data over a common data bus, as required by the instruction fetched during the previous cycle; and
One 12-bit by 12-bit "free-running" multiplication.

The functions added to the signal processor module on the board 62 are:

Buffering of instruction address lines, data address lines, and data bus lines, all converted to have tristate characteristics;
Change of polarity of the data bus lines;
Control lines −DE and +DR/−W for data memory access, and
−IE and +IR/−W for instruction memory access, converted to have tri-state output characteristics;
RUN/HALT/STOP LED indicators; and
Data Read/Write Gate control (via CLKBD).

The signal processor chip provides a 16-bit instruction address bus 184 connected to the instruction address register 122, 124, and a 12-bit data address bus 182 originating from the data address register 134. Four bits of the instruction address register must be viewed as "page" bits, because normal incrementing of the program counter is confined to 12 bits and the conditional branching allows changing only 12 bits of the instruction address register. Full 16-bit addressability and the setting of these "page" bits is provided in unconditional branching (BRD) and when using the indirect branch instruction (BRM).

In the signal processor board 62, the four "page" bits of the instruction address are split between the instruction and data memories rather than provide a separate data page register which would result in execution time overhead. Thus, the two least significant bits of the instruction page register, IABP0 and IABP1 are used for addressing the 16K word of instruction memory, whereas the two most significant bits, IABP2 and IABP3, are used to address the 16K word of data memory. Note, however, that the preferred embodiment described above supports only 8K words of instruction memory.

The following is a list of all signal processor interface lines carried from the signal processor board 62 to the host attachment board 42:

| | |
|---|---|
| +DAB(11-0) | 12-bit data address, +DAB(11) . . . MSB (tri-state (TS) output). |
| +DB(15-0) | 16-bit data bus, +DB(15) . . . MSB (input and TS output). |
| −DE | Data memory access enable. Normally high, low during half of cycle in which data transfer occurs (TS output). |
| +DR/−W | Data Read/Write (TS output). |
| +DEW | Data enable during a Write operation (output). |
| +IABP2 | Instruction address page bit 2 (TS output). |
| +IABP3 | Instruction addres page bit 3 (TS output). |
| +IAB (11-0) | 12-bit instruction address (TS output). +IAB(11) . . MSB +IAB(0) . . LSB |
| +IB (26-0) | 27-bit instruction bus (Input). |
| −IE | Instruction memory access enable. During cycle steal to instruction store, line is switched from high-impedance to a low-impedance state by the CSS (TS output). |
| +IR/−W | Instruction read/write During cycle steal write this line is switched from high-impedance to a low-impedance state by the CSS (TS output). |
| +IABP0 | Instruction address page bit 0 (TS output). |
| +IABP1 | Instruction address page bit 1 (TS output). |
| +A_CLK | LSSD clock signal from the HAB clock generator (input). |
| +B_CLK | SP input clock signal from the HAB clock generator (input). |
| +C_CLK | SP input clock signal from the HAB clock generator (input). |
| −LSSD_IN | Input signal for LSSD diagnostics of internal SP registers (input). |
| −LSSD_OUT | Output signal for LSSD diagnostics of internal SP registers (output). |
| −RESET | SP reset (input). |
| −INT | Interrupt request - active low (Input). |

-continued

| | |
|---|---|
| −INTA | Interrupt acknowledge (Output). |
| −NOP | When low, instruction memory can be scanned for parity errors while no instruction is actually excuted (input). |
| −IRAM | Instruction memory disable line (input). |
| +PARITY | Instruction memory parity error signal (output). |
| +CLKBD | A write disable signal for the data memory (input). |
| +HALTA | Halt acknowledge. High indicates that all TS output lines are driven into a high-impedance state (input). |

We claim:

1. A real time data acquisition and processing system, comprising:

resident host processor means (24);

input means (32, 34, 46) for receiving data signals representing data to be processed, said input means including an amplifier (46) for amplifying said data signals, said amplifier having a gain programmable in accordance with gain control signals and a bandwidth programmable in accordance with bandwidth control signals, said input means being coupled to a communication bus means (30, 64) and said gain and bandwidth control signals being provided by said resident host processor means via said communication bus means;

signal processor means (62) for processing the amplified data signals and coupled to said resident host processor means via said communication bus means for exchanging communication signals with said resident host processor means serving as a resident host for said signal processor means; and data acquisition bus means (38, 72) for forwarding said amplified data signals to said signal processor means independently of said communication bus means.

2. A data acquisition and processing system as defined claim 1, wherein said data acquisition bus means comprises analog to digital (A/D) conversion means (80) for receiving and digitizing said amplified data signals, buffer storage means (76) for temporarily storing said digitized data signals from said A/D conversion means, a first data acquisition bus portion (72) for transfer of digitized data signals between said buffer storage means and said signal processor means, and intelligent peripheral processor means (70) for controlling data transfer over said first data acquisition bus portion.

3. A data acquisition and processing system as defined in claim 1, wherein said signal processor processes said amplified data signals so as to recognize said data and wherein an operating speed of said signal processor means is substantially faster than an operating speed of said resident host processor means, said system further comprising intelligent peripheral processor means for controlling transfer of said data over said data acquisition bus means, thereby relieving said resident host processor means and signal processor means of a task of controlling high data rate transfer on said data acquisition bus means and permitting the resident host processor means to accomplish recognition of said data on a real time basis.

4. A data acquisition and processing system as defined in claim 3, wherein said system processes said data signals so as to recognize said data and wherein said data signals are speech signals representing continuous speech to be recognized.

5. A data acquisition and processing system as defined in claim 1, wherein said system processes said data signals so as to recognize said data and wherein said data signals are speech signals representing continuous speech to be recognized.

6. A real time data acquisition and processing system, comprising:

resident host proecessor means (24);

input means (32, 34, 46) for receiving data signals;

signal processor means (62) for processing said data signals;

communication bus means (30, 64) for communicating between said resident host processor means and said signal processor means;

data acquisition bus means (38, 72) for forwarding said data signals to said signal processor means independently of said communication bus means, said data acquisition bus means comprising analog to digital (A/D) conversion means (80) for receiving and digitizing a continuous stream of said data signals, buffer storage means (76) for temporarily storing said digitized data signals from said A/D conversion means, a first data acquisition bus portion (72) for transfer of digitized data signals between said buffer storage means and said signal processor means, and intelligent peripheral processor means (70) for controlling data transfer over said first data acquisition bus portion; and means (78) coupled in common to said communication bus means (64) and said data acquisition bus means (72) for permitting communication between said resident host processor means and said peripheral processor means.

7. A real time data acquisition and processing system, comprising:

resident host processor means (24);

input means (32, 34, 46) for receiving data signals;

signal processor means (62) for processing said data signals;

communication bus means (30, 64) for communicating between said resident host processor means and said signal processor means; and data acquisition bus means (38, 72) for forwarding said data signals to said signal processor means independently of said communication bus means, said data acquisition bus means comprising analog to digital (A/D) conversion means (80) for receiving and digitizing a continuous stream of said data signals, buffer storage means (76) for temporarily storing said digitized data signals from said A/D conversion means, a first data acquisition bus portion (72) for transfer of digitized data signals between said buffer storage means and said signal processor means, intelligent peripheral processor means (70) for controlling data transfer over said first data acquisition bus portion, and direct memory access (DMA) control means (82) for controlling storage of digitized data signals in said buffer storage means (76) via said first data acquisition bus portion according to a DMA process.

8. A data acquisition and processing system as defined in claim 7, wherein said signal processor means includes a data memory (40) for receiving and storing data signals from said buffer storage means, said system further comprising cycle steal control means (96) for controlling storage of data in said data memory according to a cycle steal process.

9. A real time data acquisition and processing system, comprising:

resident host processor means (24);

input means (32, 34, 46) for receiving data signals representing data;

signal processor means (62) for processing said data signals;

communication bus means (30, 64) for communication between said resident host processor means and said signal processor means;

data acquisition bus means (38, 72) for forwarding said data signals to said signal processor means independently of said communication bus means;

intelligent peripheral processor means (70) for controlling data transfer over at least a portion (72) of said data acquisition bus means; and host attachment means (42) coupled to said communication bus means (64), said data acquisition bus means (72) and said signal processor means (62), for selectively connecting said signal processor means to either said communication bus means whereby said resident host processor means operates as a local host for said signal processor means, or to said data acquisition bus means whereby said peripheral processor means operates as a local host for said signal processor means.

* * * * *